Figure 2A:
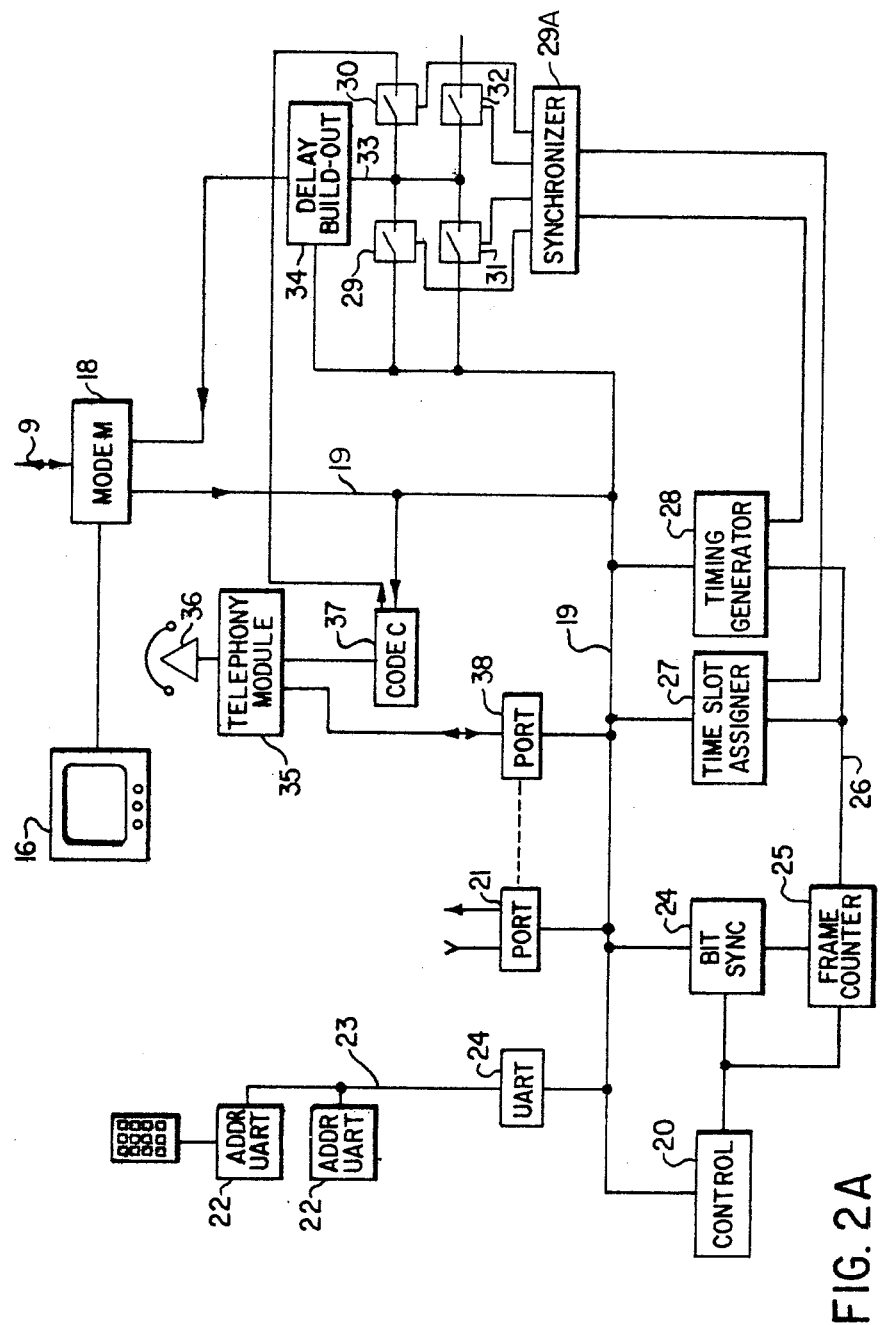

United States Patent [19]

Gimple et al.

[11] 4,430,731

[45] Feb. 7, 1984

[54] VIDEO AND DATA DISTRIBUTION MODULE WITH SUBSCRIBER TERMINAL

[75] Inventors: Irving Gimple; William Rodman, both of Montreal, Canada

[73] Assignee: The Manitoba Telephone System, Winnipeg, Canada

[21] Appl. No.: 258,746

[22] Filed: Apr. 29, 1981

[30] Foreign Application Priority Data

Apr. 30, 1980 [CA] Canada .................................. 350915

[51] Int. Cl.³ ......................... H04J 3/00; H04N 7/14
[52] U.S. Cl. ...................... 370/30; 370/112; 358/84
[58] Field of Search .................. 370/124, 69.1, 71, 73, 370/85, 112, 29, 120, 30, 50, 26; 179/2 DP; 358/84, 85; 375/8

[56] References Cited

U.S. PATENT DOCUMENTS

| | | | |
|---|---|---|---|
| 3,840,812 | 10/1974 | Takeuchi | 370/30 |
| 3,992,589 | 11/1976 | Kuegler | 370/120 |
| 3,993,955 | 11/1976 | Belcher et al. | 358/85 |
| 4,057,829 | 11/1977 | Moorehead | 358/84 |
| 4,142,156 | 2/1979 | Freund | 358/84 |
| 4,152,543 | 5/1979 | Prudhon et al. | 370/112 |
| 4,326,289 | 4/1982 | Dickinson | 370/30 |

*Primary Examiner*—Gerald L. Brigance
*Attorney, Agent, or Firm*—Stanley G. Ade

[57] ABSTRACT

A subscriber data distribution system comprising first means for translating data received from a transmission line and transmitting the data to a subscriber terminal via a subscriber drop, second means for translating data received from a subscriber terminal and transmitting the data to the transmission line, the first and second means including means for isolating the transmission line from the subscriber terminal, and for regenerating the data transmitted both to and from the subscriber terminal.

27 Claims, 13 Drawing Figures

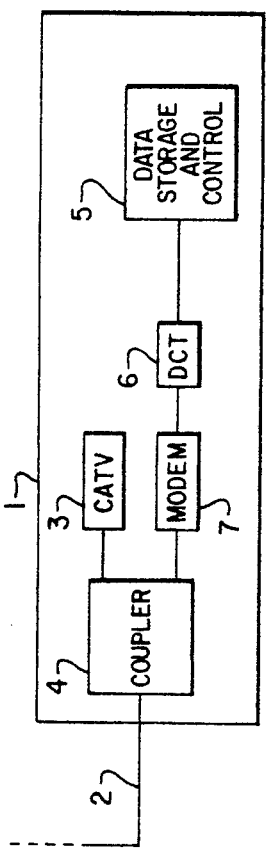
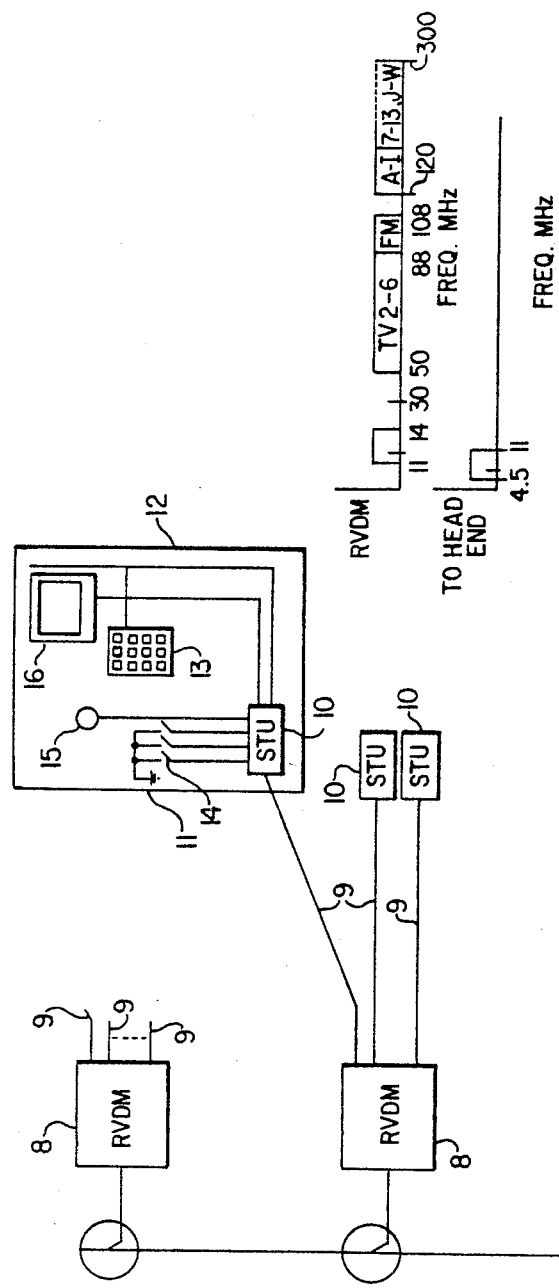
FIG. 1A
FIG. 1

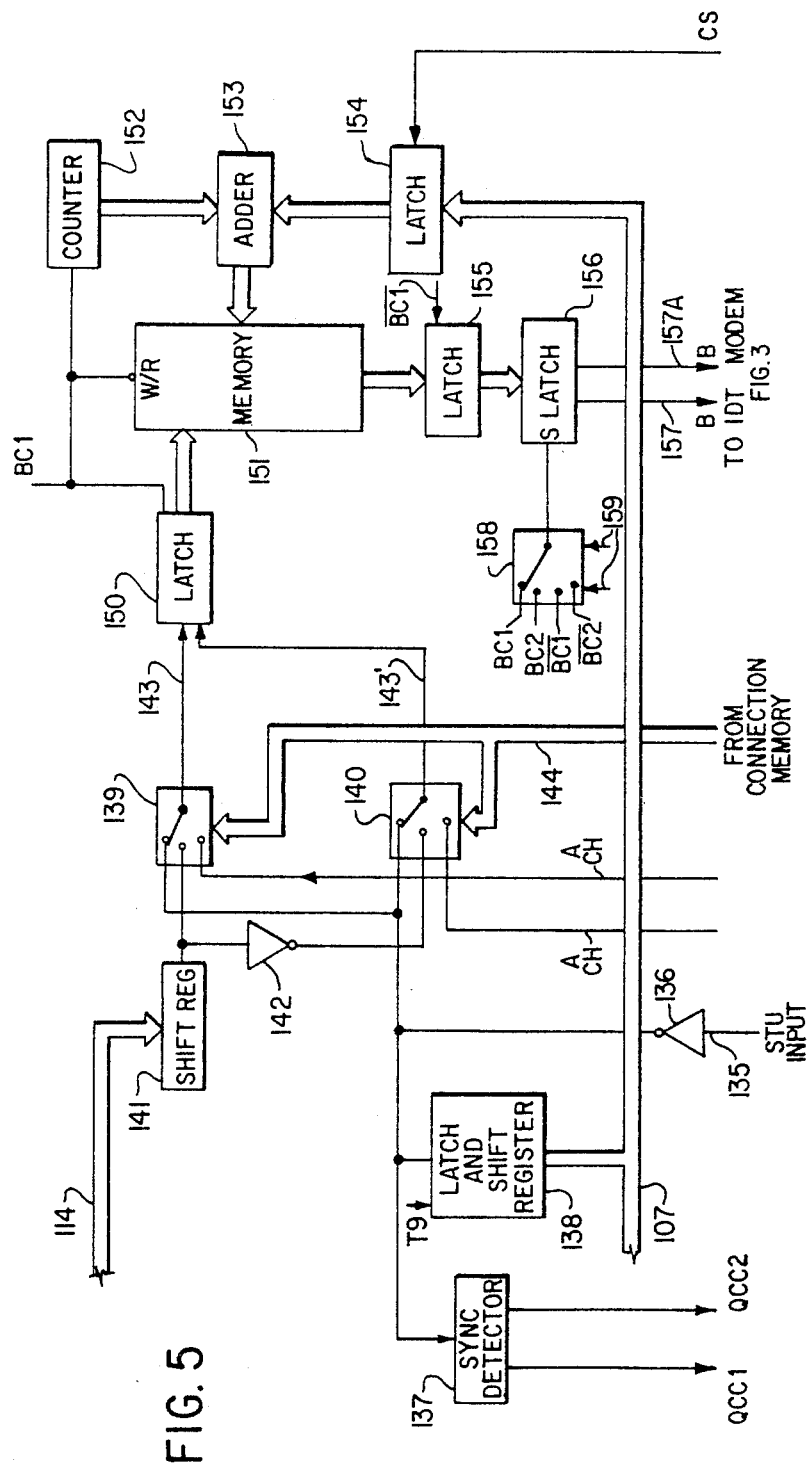

VIDEO AND DATA DISTRIBUTION MODULE WITH SUBSCRIBER TERMINAL

This invention relates to transmission systems and particularly to two-way interactive distribution and subscriber terminals.

Systems have been proposed for the distribution of data to individually addressed subscriber terminals, data and video acquisition and interaction from and between subscriber terminals, acquisition of data from energy meters, burglar and fire alarms, etc., located on a subscriber's premises, etc. These systems are most efficiently implemented using a "tree" type distribution system along CATV distribution system model. In this system a main trunk, fed from a head end terminal, feeds a plurality of branch lines, with individual subscribers connected to the branch lines. This system is of course one way, cable TV programs being distributed to various subscribers.

Such system have been in the past limited in the acquisition of data from the subscribers toward the head end by the problem of noise gathering. This problem results in noise from subscriber terminals adding and being amplified by return amplifiers, seriously degrading the signal quality. Accordingly return signals have been limited to high amplitude, very low frequency signals, such as what could be produced by burglar alarms, fire alarms, and energy meters.

The two-way transmission of data at high speed, however, has been a problem, in which useful amounts of data from a large number of subscribers must be forwarded to a head end terminal. Of necessity, to accommodate a large number of subscribers on a typical tree type system, the signal speed must be significantly higher than the relatively simple systems noted above.

In the present invention, the noise gathering aspect of the return direction transmission is substantially reduced by introducing a video and data distribution module which regenerates data passing in both directions. Because the data is regenerated, noise generated at the subscriber terminals is substantially reduced. The present invention is directed to the first data regeneration module and its associated group of subscriber terminals.

In the present system, it is preferred that transmission should take place according to a packetized DS-1 format. In a typical DS-1 format, the data signal is forwarded in frames, 8000 frames per second being transmitted. Each frame is comprised of 193 bits, divided into 24 time slots, and one frame bit, each time slot being comprised of 8 bits. Each of the 24 time slots thus provides one channel.

The 193rd bit in each frame is called a frame bit. Twelve frames form a superframe; the frame bits on each 12 frames forming a predetermined repeating pattern. The frame bit pattern is used for synchronization.

The 8th bit of each time slot on the 6th frame and each 6th frame thereafter forms a low speed so-called "A" signalling channel. The 8th bit of each time slot on the 12th frame and each 12th frame thereafter forms a second low speed so-called "B" signalling channel. Each of the A and B signalling channels provides 24, 666 bit per second data channels. Each of the 24 time slots within a frame provides a 64 kilobits per second data channel.

The problem of synchronization between terminals of the system is solved using an invention described in patent application Ser. No. 258,561, filed Apr. 25th, 1981 and assigned to the same assignee, which is incorporated herein by reference.

In general, the invention is a subscriber data distribution system comprising first means for translating data received from a transmission line and transmitting the data to a subscriber terminal via a subscriber drop, second means for translating data received from a subscriber terminal and transmitting the data to the transmission line, the first and second means including means for isolating the transmission line from the subscriber terminal, and for regenerating the data transmitted both to and from the subscriber terminal.

More particularly, an embodiment of the invention is a subscriber communications terminal comprising a modem for receiving data signals modulated on an incoming carrier having a first frequency, for deriving a bit clock signal from the incoming carrier and for transmitting data signals on an outgoing carrier having a second frequency, means for applying the received data signals to a bus system, means for connecting a plurality of ports to the bus system, the ports being adapted to connect data generating apparatus to the bus system, when enabled, means for applying outgoing data signals to the modem for modulation on the outgoing carrier, control means connected to the bus system and to the means for connecting a plurality of ports for controlling the operation of the ports, and for generating said outgoing data signals in response to the application of control signals from the data generation apparatus to the bus system, in synchronization with said bit clock.

According to another embodiment, the invention is an interactive buffer and controller modulus for distributed subscriber terminals comprising means for receiving incoming data signals from a transmission line, the data signals being divided into a plurality of frames, each frame being divided into a plurality of channels, each channel having a predetermined number of bits, each frame terminating with a frame bit, the data signals designated as address, data and control signals, means for stripping off the control signals and integrating new control signals with the data signals, means for carrying the data and new control signals to an output switching circuit, a plurality of subscriber drops, means for switching the data and new control signals to predetermined ones of the subscriber drops, and controller means for controlling the switching means whereby said data and new control signals are applied to designated ones of said subscriber drops.

Figure 2B:
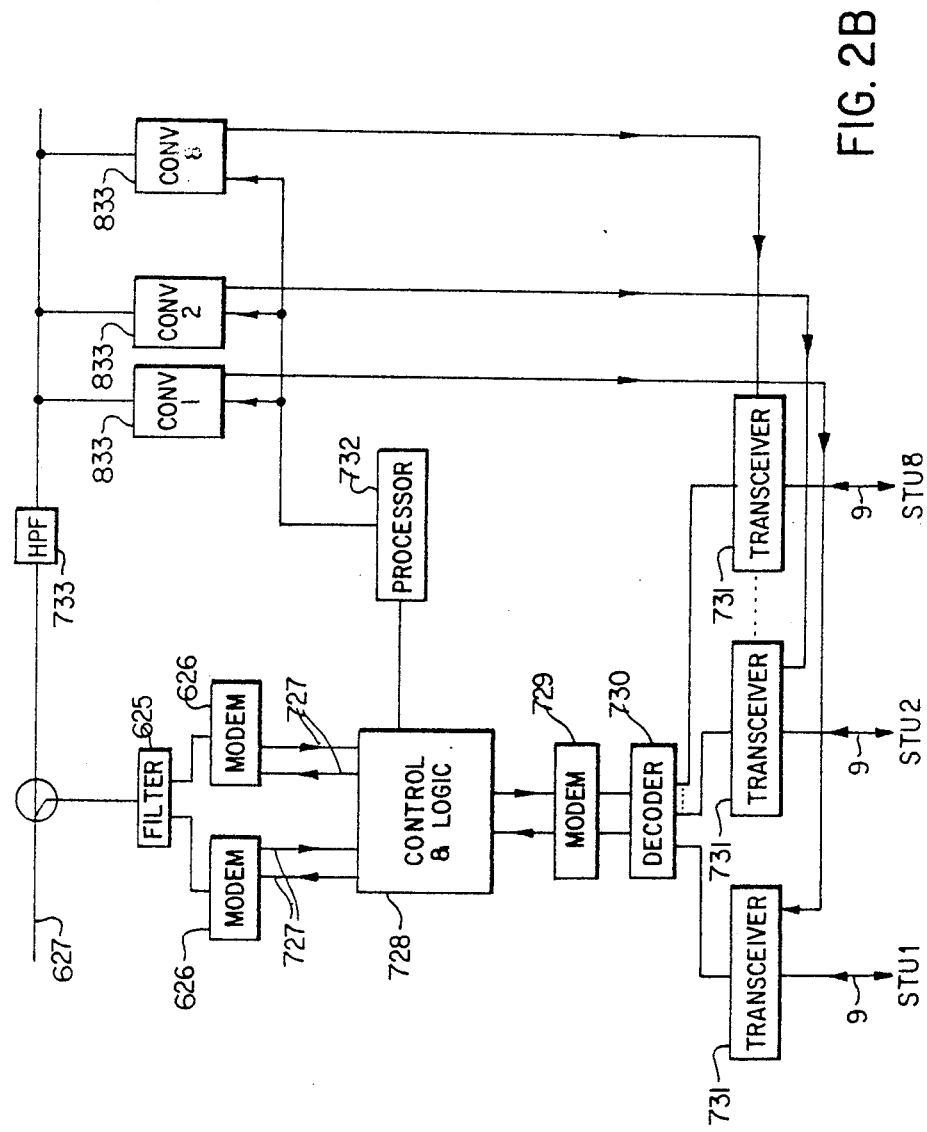
Figure 3:
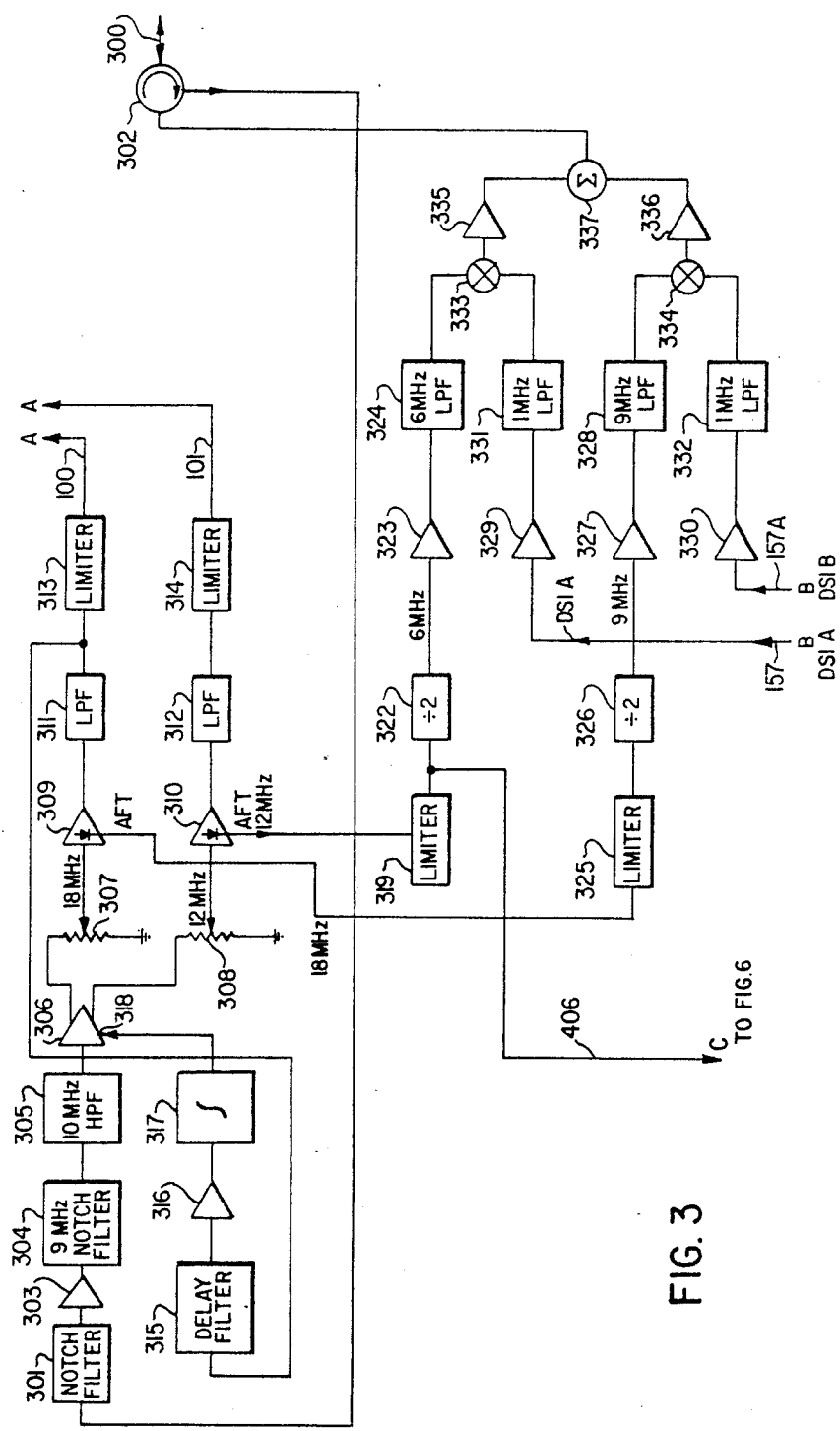
Figure 4:
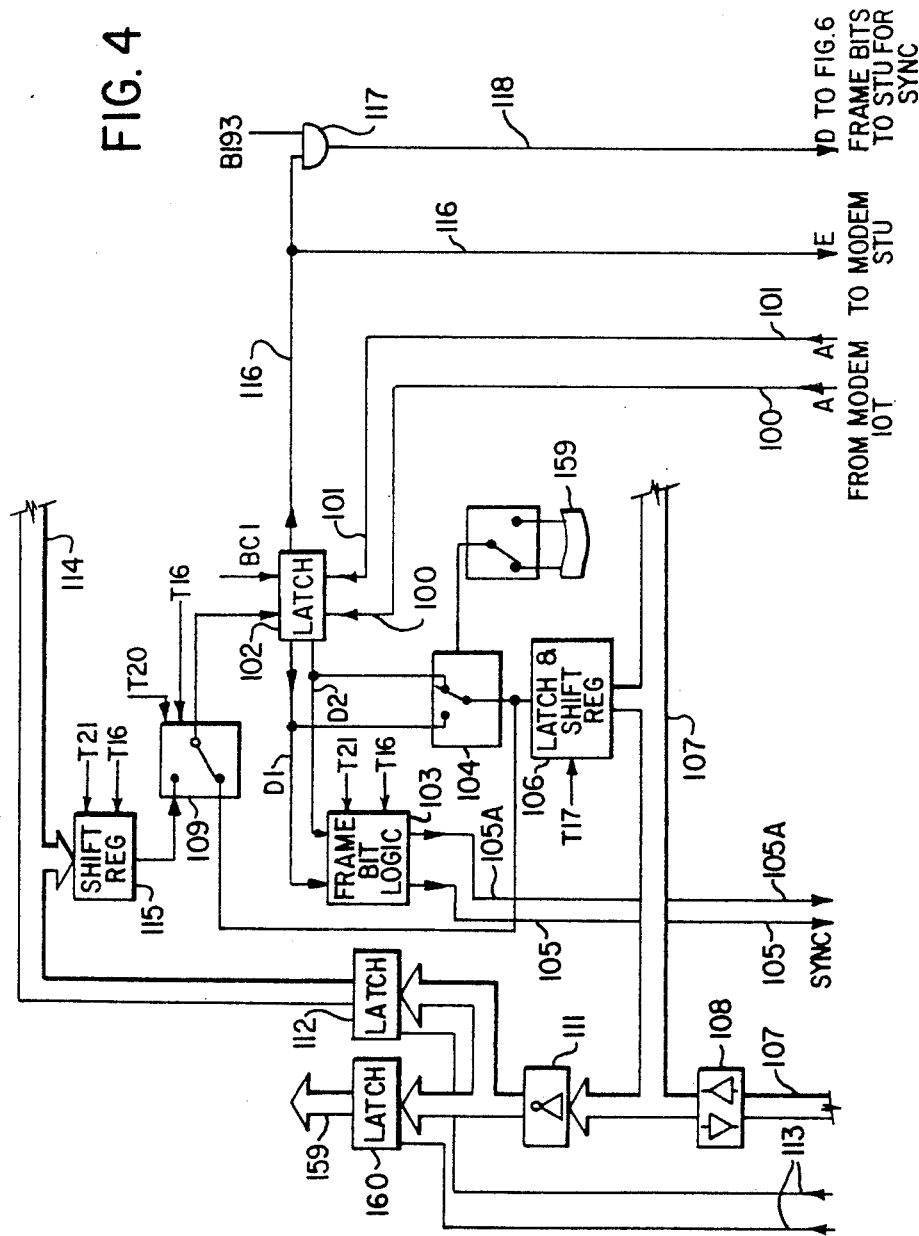
Figures 4A, 6:
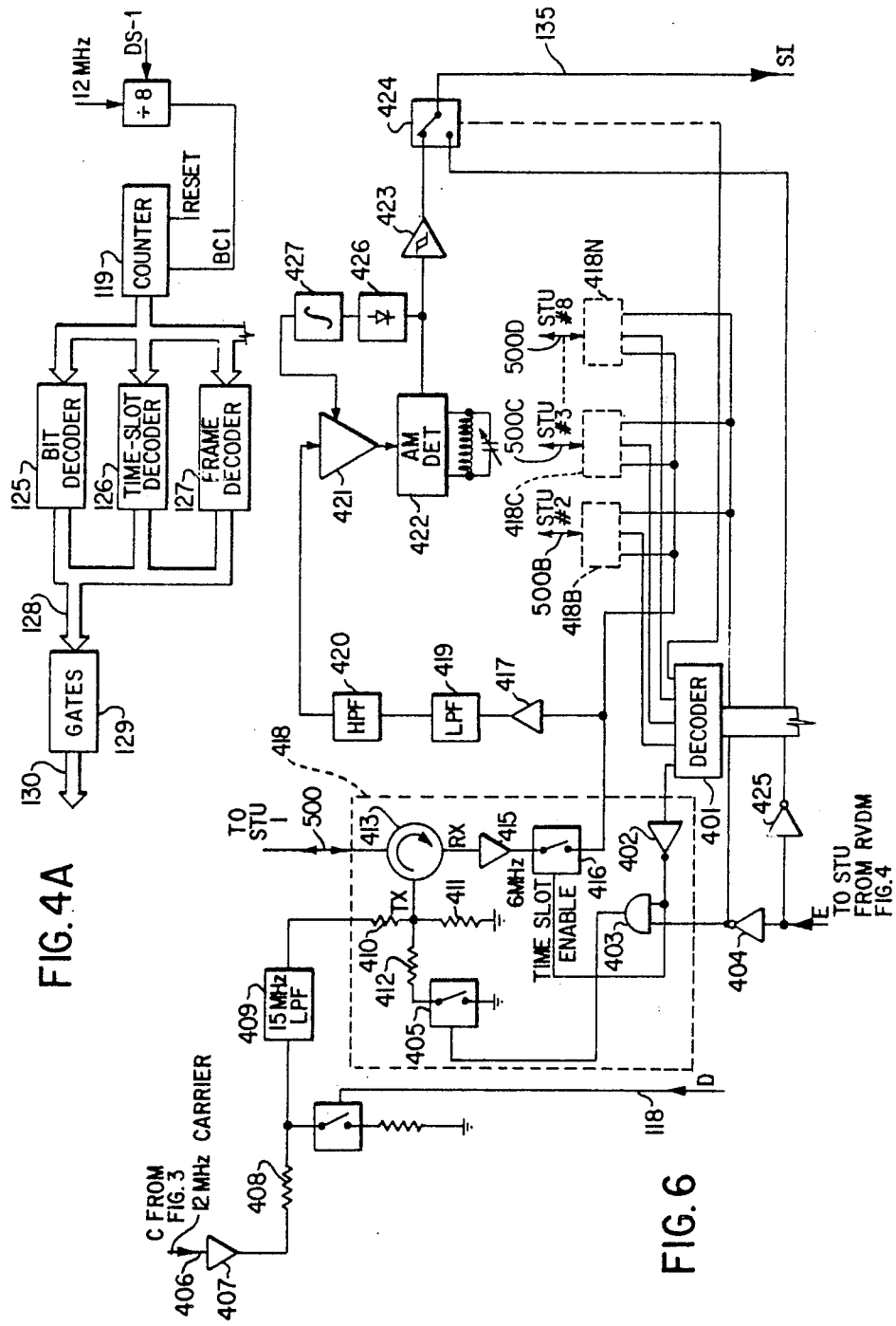
Figure 5A:
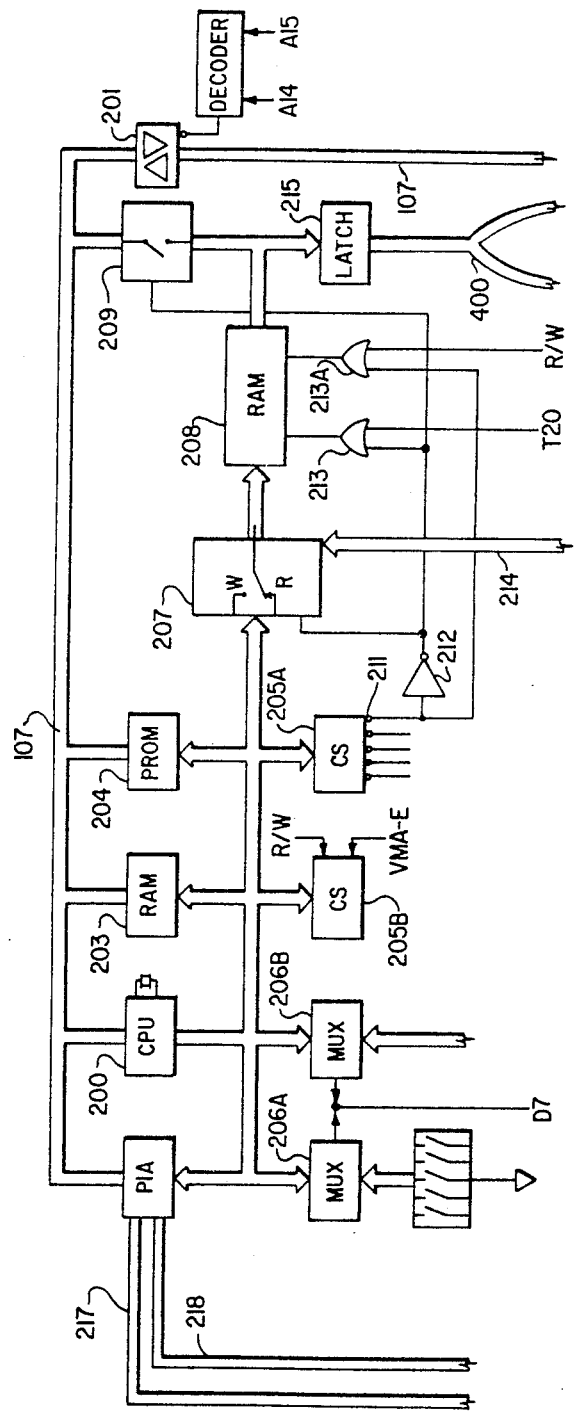
Figure 7:
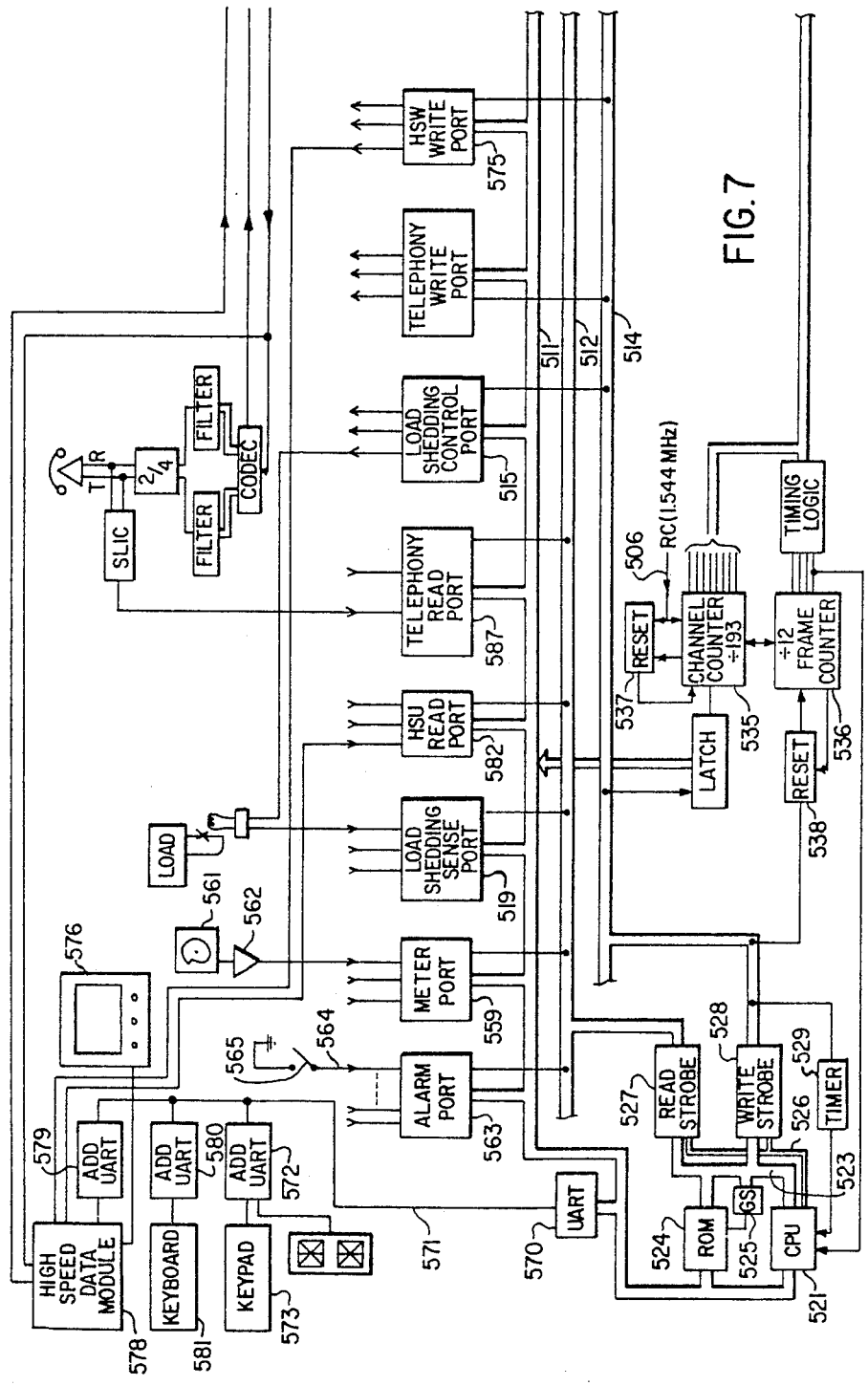
Figure 8:
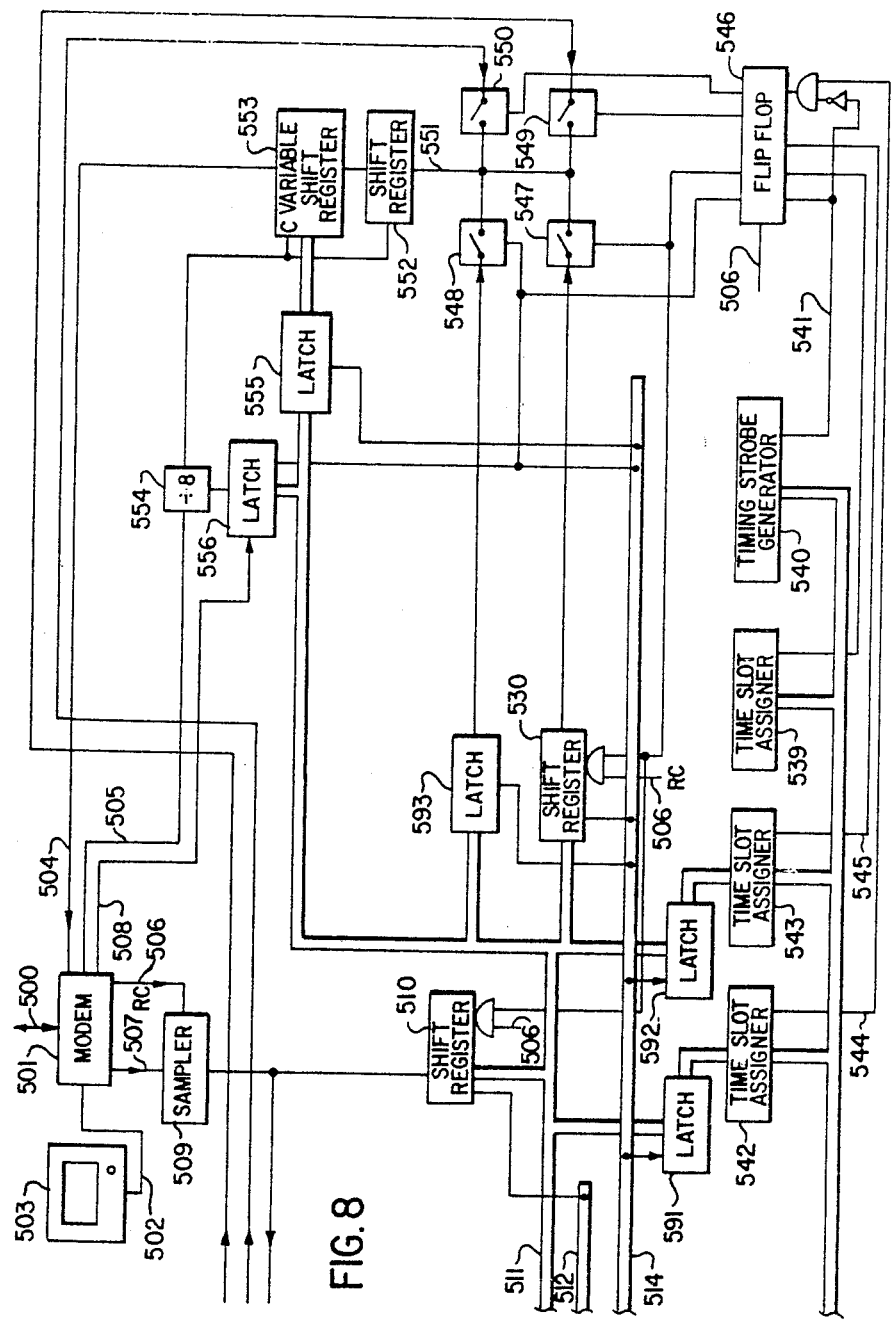
Figure 9:
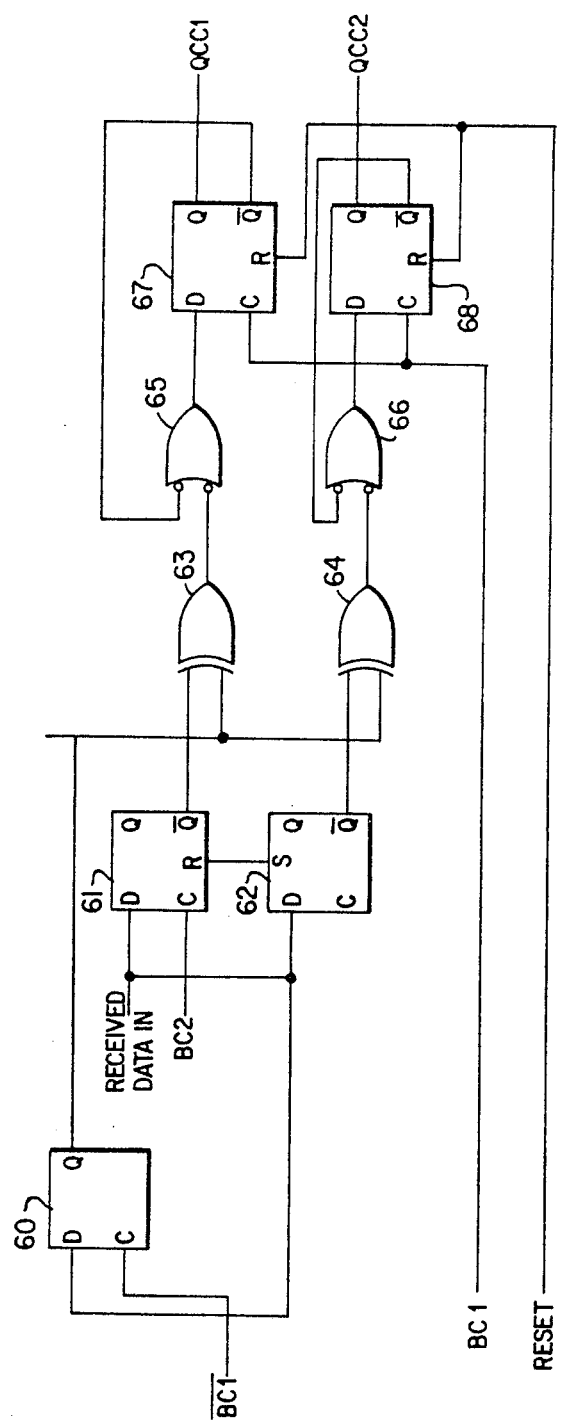
Figure 10:
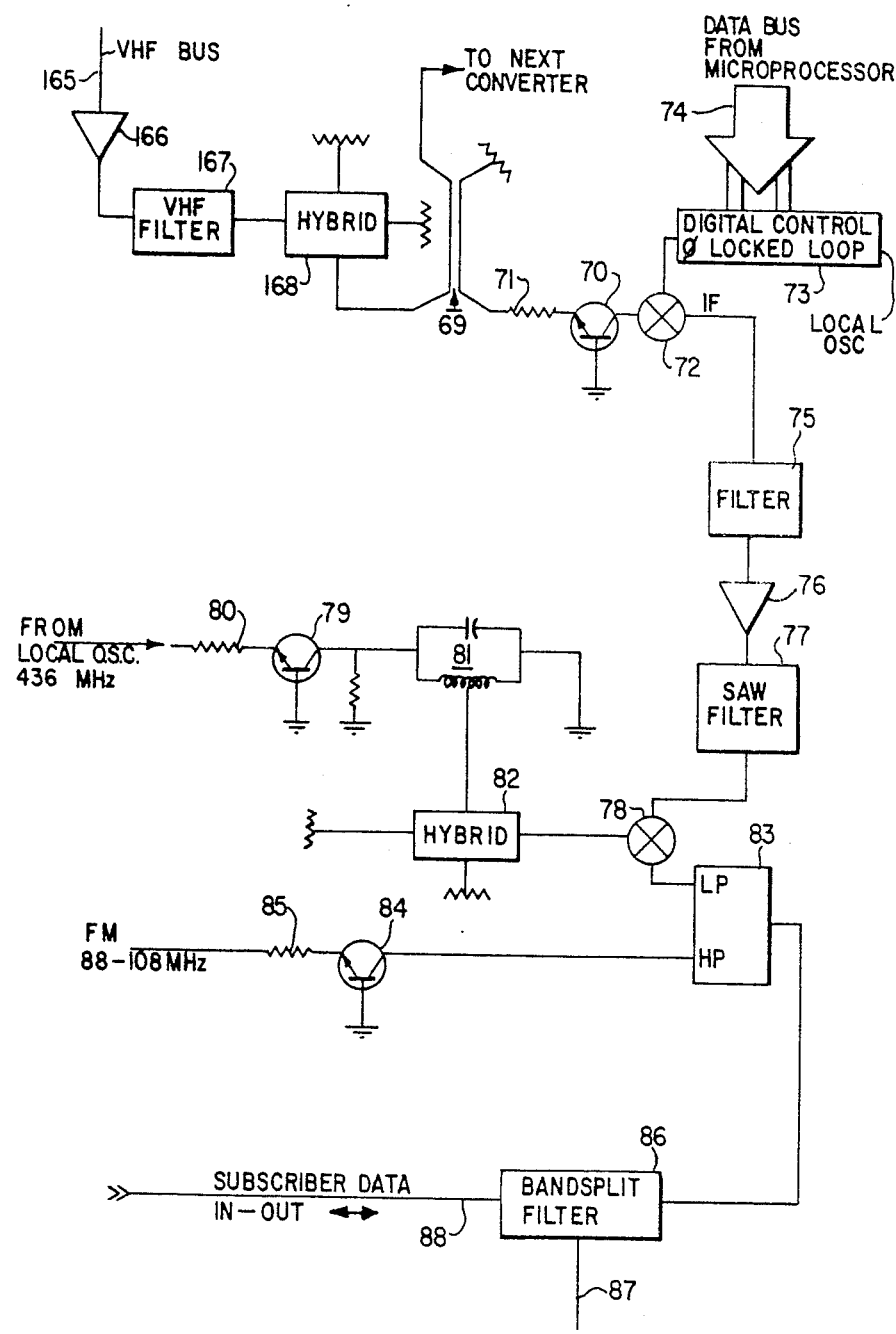

Features and the preferred embodiment of the invention will be better understood upon reading the detailed description below, in conjunction with the following drawings, in which:

FIG. 1 is a general block diagram of a system using the invention,

FIG. 1A is a frequency diagram showing the frequencies of transmissions in both directions, FIG. 2A is a general block diagram of a subscriber terminal, FIG. 2B is a general block diagram of the video-data distribution module, FIG. 3 is a diagram of the preferred form of a modem used in the video-data distribution module, FIG. 4 is a diagram of the elements of the video distribution module translating data from the transmission line to the subscriber terminal, FIG. 4A is a block schematic of a circuit for generating timing signals, FIG. 5 is a diagram of the portion of the data distribution module which translates data from the subscriber terminal to the outward-going transmission line, FIG. 6 is a diagram of a modem and interface circuit between the video-data distribution module and the subscriber terminal, FIGS. 7 and 8, when placed together, forms the diagram showing the preferred embodiment of a subscriber terminal, FIG. 9 is a logic schematic of a synchronization detector and FIG. 10 is a diagram of a preferred form of a television converter.

Turning first to FIG. 1, a general system of the type which uses the invention is shown. A head end 1 is coupled to a wide band, two-way transmission medium 2 such as a coaxial cable, fiber optic link, or the like. The head end includes a cable TV distribution frame 3, of well known form, which provides television channels such as channels 2–6, A-W and 7–13 as well as F.M. broadcasts. These signals are applied through coupler 4 to transmission medium 2. It may be seen in FIG. 1A that these signals generally are transmitted from 50 megahertz up to about 300 megahertz, although higher frequency signals can be transmitted as such distribution systems improve in capability.

An interactive data system is also coupled to the transmission medium. This generally is comprised of a data storage and control frame 5, which includes a computer, a distribution control terminal DCT 6, which is connected via modem 7 to coupler 4, and which couples the signal to the transmission medium. The system including data storage and control, distribution control terminal 6, and modem 7 is an interactive terminal and both receives and transmits data. This terminal polls individual remote stations, accessing data stored thereat, and forwards instructions and data to the remote terminals. Data which is gathered are, for example, pay T.V. channel accessing data, T.V. converter channel change data, energy meter usage data, requests for specific data to be accessed, as well as burglar and fire alarm triggering data, etc.

While the head end does not form part of the present invention, it should be noted that is preferred that the data signals should be in the form of the well known DS-1 type of transmission. In this form of transmission, the data is transmitted in frames of 193 bits, the 193rd bit forming a so-called frame bit. The remaining 192 frames are divided into 24 time slots of 8 bits each. Preferably the data is transmitted in packets of information, which includes destination address, instruction, data, parity bits, and termination bits. Signals transmitted from the head end toward the remote stations are preferably modulated on a 12 megahertz carrier, and signals received at the head end are preferably modulated on a 6 megahertz signal. The frequency allocations are shown in FIG. 1A.

Connected to the transmission medium are remote video data distribution modules RVDM 8. The RVDMS are located in subscriber neighbourhoods, each RVDM serving typically 12 households. Each RVDM is coupled via two-way subscriber drops 9 to a subscriber terminal unit STU 10, located typically in the basement of a subscriber's home 11. Connected to the STU is an asynchronous bus 12, to which such typical pieces of apparatus as keypads 13, keyboards, burglar alarms, or other addressable modules are connected. Also connected to the STU, in the alternative to being connected to the asynchronous bus, are interface circuits connected to burglar or fire alarm switches 14, energy meters 15, or the like. A T.V. set 16 is also connected to the STU for receiving video channels. The T.V. set is normally connected to the subscriber drop 9, which carries the video channel along with the data. However, as will be described later, a T.V. set or other video monitor can be connected to a high speed unit which is an optional portion of the STU for displaying alpha-numeric or graphical data. Clearly with the facility of the connection of keypads, and data addressed from the STU to the head end and return, an interactive data system is afforded. However this depends on the substantial reduction of noise generated by the myriad of data generation modules at each of up to several hundred or thousand subscribers connected eventually to each head end. The combination of the RVDM and STU blocks the noise gathering, and facilitates the provision of an interactive two-day data system.

FIG. 2A is a general block diagram of the preferred form of the STU. The two-way transmission line, such as coaxial cable, constituting subscriber drop 9 is connected to a modem 18. A common T.V. set 16 is connected to model 18 for receiving CATV television channels carried on subscriber drop 9. Modem 18 demodulates the data signals and applies them to a bus system 19, from where they are received by a control system 20. The control system also addresses a plurality of ports 21, which are shown as two-way ports, and which are connected to the bus system 19. Control 20, upon receiving signals addressed by the data storage and control 5 and the DCT 6 to specific ports, activates the ports and applies data thereto or receives data therefrom according to its internal timing.

An UART is also connected to data bus system 19, and as is well known translates data addressed thereto from parallel to serial, with an asynchronous format, having a start bit, address sequence, data sequence, parity bit, and termination bit. The UART is connected via asynchronous bit 23 to one or more addressable UARTs 22. Various types of keypads, keyboards, displays, etc., are connected to the addressable URATs, as will be described in more detail later. Also energy meters, burglar alarms, etc., can be connected to the addressable UART.

Also connected to the bus system 19 is a bit synchronization circuit 24, which is also connected to a frame counter 25. The control circuit 20 is also connected to the bit synchronization circuit and frame counter.

The output of the frame counter is a timing signal bus 26, which is connected to a time slot assignor 27 and timing generator 28. The time slot assignor and timing generator are also both connected to the bus system 19.

The outputs of the time slot assignor 27 and timing generator 28 are connected to a synchronizer 29A, which has its outputs connected to the control inputs of a plurality of switches 29–32, which can be tri-state gates controlled by the synchronizer. Under control of the timing generator and time slot assignor, the synchronizer closes one of each of the gates 29–32 at the proper time in order to output signals in the proper frame time. This will be discussed in more detail later.

Bus system 19 also is connected through decoders (not shown) to switches 29 and 31, whereby data signals can be applied to a common output lead 33. Common output lead 33 is connected to the input of a delay build-out circuit 34, the output of which is applied to modem 18 for remodulation and outputting on subscriber drop 9 to the video and data distribution module 8.

The present invention also provides means for operating a digital telephony system. A telephony module 35, which includes filters, a two/four wire network, a subscriber line interface circuit (SLIC), etc., is connected to a local analog telephone set 36. A codec 37 interfaces the telephony module 35 with the data output of modem 18. A port 38 is connected between bus system 19 and telephony module 35, for commanding and reading supervisory signals and ringing. The output of codec 37 is connected to the input of switch 30 for application of outgoing data signals to the subscriber drop. Another high speed port (not shown) can be utilized for receiving and transmitting high speed data to a remote data terminal, and its outgoing signals are applied to the input of switch 32 (shown not connected). In this manner, signals are applied to the delay build-out circuit 34 for application to modem 18 and transmission by a subscriber drop 9 to the RVDM 8.

Delay build-out 34 has a variable delay, the control inputs of which are connected to the bus system 19. Under control of control system 20, the delay of delay build-out 34 is established, just sufficient to transmit data signals to the RVDM whereby it arrives in exact synchronism with the signals transmitted from the RVDM to the STU. The mechanism by which this operates will be described in more detail later.

Turning now to FIG. 2B, a basic block diagram of the RVDM is shown. Transmission medium 2 is connected via a normal CATV splitter to the RVDM the input line of which is shown at 627. A low pass filter and splitter 625 passes signals including 18 megahertz, and blocks those above. Two signals preferably, in inverse relationship to each other, constituting two DS-1 channels are applied in parallel to modems 626. While two modems are preferred to handle both signals, (inverted from each other for redundancy and error correction), the signal operation and translation below, described in detail, with relate only to one signal since both signals are handled similarly.

The bidirectional signal is carried on bidirectional pads 727 to the control and logic 728 of the RVDM. Here the signals are processed in both directions, isolating the STU from the transmission medium 2. The signals in both directions are passed through modem 729, decoder 730 and through transceivers 731 to individual subscriber drops 9, leading to STU1, STU2 . . . STU8.

In operation the control and logic controls a switch in decoder 730, which sends and receives data signals to each of the STUs via corresponding STU drops in individual time slots allocated in sequence. In the preferred embodiment of the invention there are 12 STUs possible for each RVDM, and 24 time slots, allowing each STU to be scanned twice in each frame. Again in the preferred embodiment of the invention, only one frame, frame 6, is allocated for all the STUs, and data is transmitted and received from the STUs in that frame.

The control and logic 728 is itself controlled by a microprocessor 732.

Also connected to transmission medium 2 is a high pass filter 733 which blocks frequencies below about 15 megahertz and passes CATV television signals which are, of course, of higher frequency. A plurality of television channel converters 833, one for each STU, is connected to the output of high pass filter 733. The output of each converter is connected to a corresponding subscriber drop for transmission of a television channel along the subscriber drop, for reception by a television set, such as television set 16 (FIG. 2A). Control inputs of converters 833 are connected to microprocessor 732.

Upon reception of converter control signals from a corresponding STU within an allocated time slot, which signals are received through transceiver 731, modem 729, control and logic 728 to processor 732, the corresponding converter changes channels, and transmits the selected signal on channel 2 or 3 (or another unused channel) to the STU. At the same time, the channel change control information is retained by processor 732, and upon polling from a head end connected to transmission medium 2, the channel change information is transmitted thereto for recording. In this manner pay T.V. selection or control signals can be recorded at the head end, as well as the selection of special services or extended service television channels.

Further, interrogation or control signals for various units connected to the ports or addressable UARTs at the STU are received from transmission medium 2, demodulated in modem 626, processed in control logic 728, demodulated in modem 729 and are applied to the appropriate STU designated by the time slot of the received data or, if the data is received in packets, by the address of the port at the STU. The STU demodulates the received signal in modem 18, the control signal is received in control 20 (FIG. 2A), and the appropriate port is enabled and addressed.

Return signals from the port or data generation apparatus at the STU is passed via bus 19 and switch 31 to delay build-out 34. Switch 31 is controlled by synchronizer 29 which itself is controlled by time slot assignor and timing generator 28, further under control of the timing signals and controller 20. The signals are delayed in build-out 34 until the proper time for transmission within the predesignated time slot, and is passed into modem 18 for remodulation and transmission via subscriber drop 9 to the RVDM. Here it is received in transceiver 731, passed through modem 729, control logic 728 to processor 732. Under control of processor 732, the data is reformatted, delayed for proper synchronization at the RVDM, and is transmitted via modem 626 to transmission medium 2 to the head end, where it is received in exact synchronization, one frame delayed, with the outgoing signal at head end 1.

It should be noted that data from the RVDM is transmitted to the transmission line in two data streams, one the inverse of the other, one modulated on a 6 megahertz carrier and one modulated on a 9 megahertz carrier. Data is received from the transmission line as two data streams, one the inverse of the other, one modulated on a 12 megahertz carrier and one modulated on an 18 megahertz carrier. The data is thus considered as being contained within a 1-30 megahertz bandwidth.

In addition, the transmission line carries power for the RVDM, typically 90-100 volts at 60 hertz, and video signals, typically 60-300 megahertz, including f.m. radio, 88-108 megahertz.

The circuit to be described below assumes that all signals except the 6, 9, 12 and 18 megahertz signals have been stripped off the transmission line, and deals with those signals only. Since in this invention the bit clock is derived from the 12 megahertz carrier signal, the incoming signals will be considered first.

Turning to FIG. 3, the 12 and 18 megahertz signals are received from the transmission line 300, and are applied to a 9 megahertz notch filter 301 via directional coupler 302. Directional coupler 302 is a conventional CATV type coupler or the like and need merely have a 30 megahertz bandwidth.

The signal is passed through notch filter 301, low noise preamplifier 303, another 9 megahertz notch filter 304, 10 megahertz high pass filter 305, to the input of video amplifier 306. The action of the aforenoted 9 megahertz notch filters and 10 megahertz high pass filter is to reduce the 9 megahertz outgoing signal (which signal is the closest signal to the 12 megahertz signal to be received), to a very low level, and to otherwise pass signals above 10 megahertz, which include the 12 and 18 megahertz DS-1 modulated signals to video amplifier 306.

Video amplifier 306 separates the 12 and 18 megahertz signals, which are respectively applied via gain control potentiometers 307 and 308 to the input of low level a.m. detectors 309 and 310. These detectors are preferably are synchronous detectors, such as injection locked oscillators (such as those typically used in commercial television sets for horizontal and vertical oscillators).

The outputs of detectors 309 and 310 are respectively connected through low pass filters 311 and 312 and hard limiters 313 and 314 to leads 100 and 101. These leads carry the demodulated DS-1 bit streams, one the inverse of the other. It is preferred that low pass filters 311 and 312 should be resonant at the bit rate, and should be heavily damped. It is also preferred that limitors 313 and 314 should have above 5% hysteresis, in order to reduce multiple zero crossings for a given amount of detected noise.

The output from low pass filter 311 is also used to control the gain of both the 12 and 18 megahertz channels. This output is applied to a detector and filter 315 (which can be merely a series connected diode followed by a parallel capacitor), i.e., a peak and hold filter. The output of detector and filter 315 is applied through buffer 316 and integrator 317 to a gain control input 318 of video amplifier 306.

It was noted earlier that in the present invention the 12 megahertz carrier is used to provide a bit rate clock. The AFT output of detector 310, which carries the 12 megahertz signal is applied to fast limiter 319, and the output thereof, on a 12 megahertz signal is applied through buffer 320 to lead 321. This signal is used for conversion to the bit clock after division by 8 to 1.544 megahertz, which will be shifted to the center of the demodulated data bits.

The output of limiter 319 is applied through a divide-by-2 circuit 322 to be converted to six megahertz, through buffer 323 to the input of 6 megahertz low pass filter 324.

The AFT signal from video detector 309, 18 megahertz, is applied through fast limiter 325 and divide-by-2 circuit 326 and buffer 327 to the input of 9 megahertz low pass filter 328. Low pass filters 324 and 328 are matched filters, which convert square waves to sine waves.

The outgoing DS-1 signals are applied via leads 157 and 157a, buffers 329 and 330 to the inputs of respective low pass filters 331 and 332. These filters are preferably raised cosine filters, and are heavily damped low pass tuned filters which peak at ½ the bit rate.

The output of filter 324, which carries the 6 megahertz sine wave carrier, and filter 331, which carries one channel of DS-1 data, are applied to the inputs of balanced modulator 333. Similarly, the 9 megahertz carrier signal at the output of low pass filter 328 and the second, inverted channel data signals at the output of low pass filter 332 are applied to inputs of balanced modulator 334.

The outputs from modulators 333 and 334 are respectively applied through buffers 335 and 336 to the inputs of combiner (summer) 337. The output of combiner 337 is connected to the outgoing input of directional coupler 302, for application to bidirectional transmission line 300.

We have thus seen how signals are removed from the bidirectional transmission line and are provided as data signals, and how outgoing data signals are modulated on carrier signals at ½ the incoming frequency, and are applied to the transmission line. At the same time, the 12 megahertz incoming carrier signal is utilized to form the bit rate clock, at 1.544 megahertz.

Turning now to FIG. 4, the two DS-1 bit streams on leads 100 and 101 which are received from the main transmission line modem are applied to latch 102. Since the bit streams are received from the main transmission line, they are typically poorly shaped, and the latch is used to sample them and place them into good pulse form with proper pulse width, etc. Lead BC1 connected to latch 102 clocks the latch at the assumed centre of the data. The pulse on lead BC1 is derived from a timing control circuit as will be described later.

The corrected pulse two DS-1 bit streams appear on leads D1 and D2, and are applied to frame bit logic circuit 103 and a logical switching circuit 104 for selecting one of the two DS-1 streams on leads D1 or D2.

Frame bit strobe signals are applied from the timing control to the T21 and T16 leads, which strobe the frame bit logic circuit in time with the assumed frame bits, that is, once every 193 bits. The output appears on sync lead 105, for application to the microprocessor. The microprocessor samples the pulses on the sync lead, and compares them with a stored pattern.

The frame bit strobe on leads T21 and T16 should appear each 193 bits to provide a synchronization bit pattern on the sync lead 105. However if the sync bit pattern does not match the stored sync bit pattern in the microprocessor, the frame bit strobe signals are shifted one bit earlier. The microprocessor continues to monitor the sync bit pattern on sync lead 105 continuously, as the frame bit strobe signal shifts toward the beginning of the frame.

At one point, the frame bit pattern matches the stored pattern in the microprocessor. At that point the frame bit strobe signal on leads T21 and T16 do not shift any further, and the frame timing is assumed to have been found.

The microprocessor then monitors the frame bit on each of sync lead 105 and 105a, which respectively carry the synchronization bits for each of the DS-1 lines. Assuming that the two are identical, synchronization is assumed to have occurred. However if one differs from the other, it is assumed that a glich has occurred, or that one of the streams has gone out of synchronization, or that equipment has malfunctioned. One or the other stream can then be monitored or the timing can be synchronized as described above.

Assuming that the frame timing has been found, the A channel signalling bits are monitored. Assuming that the DS-1 stream on lead D1 is monitored, switching circuit 104 is switched to apply the signal to the latch and shift register 106. This circuit is strobed on lead T17 in time with the A signalling bit, that is, the least significant bit, in frame 6 and every 12 frames thereafter. The A signalling bit is received from switching circuit 104 and are first latched and then stored in the associated shift register serially, storing them eight bits at a time. Eight parallel bits at a time are then strobed onto the system data bus 107, for application through bidirectional interface 108 to the microprocessor. Since there are 24 A signalling bits to a frame, this will occur three times for each A signalling bit frame.

The DS-1 stream is also applied from switching circuit 104 to switching circuit 109. It should be noted that the data carried includes the entire bit stream including the A signalling bits. However since it is intended that substitute control frame or frame 1 signals should be applied to the STU, switching circuit 109 switches between the lead carrying the full DS-1 stream and a lead carrying substitute frame 1 control signals, in switching circuit 109.

The new control signals are received from the microprocessor on data bus 107, passes through bidirectional interface 108 and inverter 111, and is applied to latch 112, from which, at the appropriate time designated by a signal from the microprocessor carried by lead 113, applies the signal to bus 114. Bus 114 carries the new control signal to the input of shift register 115. Shift register 115 receives the new control signals 8 bits at a time, and shifts them out serially to switching circuit 109. Just after shifting the seventh bit out, a second group of 8 parallel bits is loaded from bus 114. In this manner all twenty-four bits of the control frame 1 are shifted out.

Under control of timing signals on the T16 and T20 leads, switching circuit 109 switches between the DS-1 data bit stream and the new source of control signals in frame 1 from shift register 115 which is substituted.

This signal is applied to latch 102 for synchronization with the incoming bit stream, and is applied on lead 116 to the STU output modem.

At the same time this signal is applied to AND gate 117 with the 193rd (frame) bit received from the timing control, providing framing bits to the STU on lead 118, for synchronization.

We have thus seen how demodulated input signals from the main transmission line are received, how the system locates the proper frame timing, extracts the A signalling bit stream and applies it to the data bus for application to the microprocessor. We have further seen how the DS-1 bit stream is applied to the STU with new or substitute control signals applied in frame 1, in place of those originally received from the main transmission line.

Turning now to the timing control, a clock signal is applied to BC1, to a divide-by-193 counter. This circuit is well known and need not be described further. However suffice to say that every 193 pulses of the bit clock, a single output pulse is provided. This can be obtained merely by subtracting 193 from the achieved count, and when a coincidence is found, an output pulse is generated. This pulse coincide with the frame bit timing.

However in order to shift the timing of the frame bit as is required for application to the frame bit logic circuit, as described earlier, the counter is converted to a divide-by-192 counter. In this case, the frame bit shifts one bit position, continuously shifting every 193 bits. When the frame bit pattern has been found by the microprocessor as described earlier the counter is converted back to a divide-by-193 bit counter.

The bit clock pulses are also applied to bit decoder 125, time slot decoder 126, and frame decoder 127, which have respective signals output therefrom divided respectively by the bit timing, time slot timing, and frame timing, depending on the required count. Since the bit clock signal applied thereto is shifted by counter 119, the outputs therefrom are also shifted by one bit time slot. Their outputs are carried on bus 128 through gates 129 to timing bus 130. Timing bus 130 is comprised of the aforenoted heads T16, T20, T21, etc.

Bit clock BC1 of course carries the 1.55 megahertz clock signal, at the data rate, with its rising edge in the middle of a data bit.

In the reverse direction, signals are received from the STU both as control signals in time slot 1 (TS-1) and in designated time slots as poled by the RVDM in designated time slots.

Normally a signal is sent by the RVDM in the circuit already described in TS1 by designating the STU by means of a code, and the STU responds by sending a HEX10 signal, that is, 00001000. This signal is used for detection of synchronization, as will be described below. Selected STUs are thus able to become synchronized. Once synchronization has occurred, STUs are requested to transmit data in designated time slots, as indicated by control messages in TS1.

Input from an STU received from a modem, as will be described below, is received on lead 135, is inverted in inverter 136, and is applied to synchronization detector 137.

In synchronization detector 137, three flip flops 60, 61 and 62 have their data inputs connected together to a source of the input serial data bit stream, i.e., to the received DS-1 data stream. Clock source $\overline{BC_1}$ is connected to the clock input of flip flop 60 and samples the received data at its presumed centre. Clock source $BC_2$ is connected to the clock input of flip flop 61 and the opposite phase of the clock source $\overline{BC_2}$, is connected to the clock input of flip flop 62. It may therefore be seen that as clock $BC_2$ advances, the input data appears alternately at output Q of flip flops 61 and 62.

The rising edge of $BC_2$ occurs ¼ bit before that of $\overline{BC_1}$. Therefore flip flop 61 samples the data ¼ bit before the assumed centre. The rising edge of $\overline{BC_2}$ occurs ¼ bit after that of $\overline{BC_1}$. Therefore flip flop 62 samples the data ¼ bit after the assumed centre.

The Q outputs of flip flops 61 and 62 are respectively connected to corresponding inputs of EXCLUSIVE OR gates 63 and 64. The outputs inputs of EXCLUSIVE OR gates 63 and 64 are connected together to a flip flop 60.

The input data applied to flip flops 60, 61 and 62 is taken from the data received from the remote unit. It is only the phase of the pulses which are of concern, and not the actual data.

The output of EXCLUSIVE OR gates 63 and 64 are connected respectively to one input of corresponding OR gates 65 and 66. The outputs thereof are respectively connected to the data inputs of corresponding flip flops 67 and 68. The $\overline{Q}$ outputs of flip flops 67 and 68 re respectively connected to the second inputs of the corresponding inverting OR gates 65 and 66. A clock source is connected to the clock inputs of flip flops 67 and 68, and the Q outputs thereof form the outputs of the circuit QCC1 and QCC 2, representing the difference in the sampled, from the received data.

If the signal is retarded from the STU, it must be advanced and lead QCC1 has a high level signal on it. Similarly if the signal from the STU is advanced, it must be retarded, and a signal appears on lead QCC2 which is high. These leads are connected to the microprocessor circuit. The microprocessor sends a control signal to the STU to advance or retard its timing by ¼ bit intervals if either QCC1 or QCC2 carry a high level signal. Accordingly the STU timing is shifted into synchronization in ¼ bit intervals.

The signal from the STU is also applied to latch and shift register 138. The serial STU data is serially received, stored in the shift register, and applied to data bus 107, similar to latch and shift register 106. Timing is determined by the signal on timing lead T9, from the timing control. It should be noted that all time slot 1 data passes into latch and shift register 138, including all messages such as meter reading data, video channel change data, etc.

Data from the STU is also applied to switching circuit 139 and to switching circuit 140. As will be noted later, this allows telephony and high speed data to be outpput to the central control.

The TS1 data and messages received from the STU having been received by the microprocessor via data bus 107 is reformatted into packets for transmission to the remote central control. The data is applied via bidirectional interface 108, inverter 111, latch 112 to bus 114 and thence to shift register 141. This shift register operates identically to shift register 115, receiving data 8 bits at time and shifting them out serially to switching circuit 139, and via inverter 142 to switching circuit 140.

The microprocessor also applies a HEX10 signal to switching circuits 139 and 140 for transmission on the A signalling channel, for synchronization detection.

The output leads 143 and 143' of switching circuit 139 and 140 carry the two DS-1 channel signals for transmission to the central control, after delay compensation.

Operation of switching circuits 139 and 140 thus affords selection of the leads carrying telephony and high speed data, etc., data from one or more of the STUs or local RVDM destined for the central control, or A signalling channel data.

The determination of what signals should be applied to output leads 143 and 143' via switching circuits 139 and 140 are controlled by the microprocessor as determined in a connection memory which has been loaded via data received on leads 100 and 101 (described earlier) from the central control. Control signals for switching circuits 139 and 140 are applied at appropriate times to cause output leads 143 and 143' to be switched to the appropriate input at the proper time.

The control signals for switching circuits 139 and 140 are received on bus 144 from the connection memory, and carries logic signals to designate what time slot is assigned, whether low speed data in on the time slot, whether video signals are on the time slot, whether output lead 143 or 143' is utilized, etc., and in general controls the logic timing of these switching circuits.

The output signals on leads 143 and 143' are applied to latch 150, which is strobed by the bit clock BCl. As noted earlier these bits are at the bit rate, of 1.55 megahertz.

The data stored in latch 150 is written into memory 151. The address of the storage is designated by the output of a 64 stage counter 152 which is incremented by the bit clock BCl. The output is applied through adder 153 to the address input of memory 151. If there is no further input to adder 153, the address is designated by the output of counter 152.

Assuming that delay compensation is to be provided, a delay signal is received from data bus 107 by latch 154, which signal is a delay difference numeral to be added to the output of counter 152 by adder 153. Accordingly, when the output of latch 154 is enabled, the stored number is added to the address of counter 152 to designate a read address to memory 151.

Memory 151 is preferred to be of the type which writes with its write/read (W/R) lead high, and reads with its W/R input low. The signal on the W/R lead is applied from the BC1, in synchronism with the output enable of latch 154. Accordingly memory 151 writes data with BC1 high at an address indicated by the output of counter 152, then reads the data out at an address offset therefrom by the value of the signal stored in latch 154.

The data read from memory 151 is applied to latch 155, which is synchronized to the falling edge of signal BC1 therein, and is then applied via latch 156 and output bus 157 to the output modem connected to the transmission line leading the central control.

Latch 156 provides ¼ bit synchronization by selective connection of its strobe input S to one of four phases of clock source BC1 which are 90° out-of-phase, BC1, BC2, $\overline{BC1}$ $\overline{BC2}$. This selection is achieved in switching circuit 158 under control from the microprocessor on bus 159. The latter bus is connected to the data bus via latch 160 which has its input connected to the output of inverter 111.

The selection of which of the four bit clock phases which are 90° (¼ bit) out-of-phase is determined by the microprocessor as a result of the presence or not of signals on the QCC1 and QCC2 leads which were described earlier. It should be noted that should more than 360° correction be required, after shifting the phase of the signal applied to the S lead of latch 156 by 360°, the signal stored in latch 154 is incremented by one, or one bit position. If synchronization is still not achieved, the ¼ bit phase shift cycles again, etc., until synchronization has occurred.

We have thus seen how the signal from an STU is received, checked for ¼ bit synchronization, and how data is received by the microprocessor. Upon being reformatted, the signal from the STU is applied through a switching circuit, is written into a memory, and is read out of memory with a delay determined under control of the microprocessor, depending on the required delay compensation to force signals to be in synchronization at the next stage in the system such as the central control. The output signal from the memory is then resynchronized, corrected for phase in ¼ bit intervals, and is applied to a bus for reception by an output modem and application to the transmission system to the central control.

Under control of the central control and data stored in a connection memory, rather than reformated data being output, telephony or high speed data can be output directly without being reformated, or, in the alternative, data directly from the microprocessor on the A channel, such as synchronization HEX10 signals.

As described earlier, data is applied to data bus 107 through the latch and shift register 106, as received from the incoming DS-1 bit stream. This data is applied to a central processing unit CPU200 (FIG. 5A) through a bidirectional interface 201. Preferably the CPU is type 6802, although other CPUs could be used. The CPU is also connected to address bus 202, along with random access memory RAM203, read-only memory PROM204 (which memories are also connected to data bus 107), chip select decoders 205, 205a and 205b, and multiplexers 206a and 206b. It has been found that RAM203 should be 8 bits wide by 128 bits long, and PROM204 should be 4,000 bits by 8 bits. Chip select decoder 205 should decode 1 of 8, 205a should decode 1 of 4, and 205b should 1 of 8.

Data applied to data bus 107 designates the STU number, and as well the control information is TS1. Data applied by the CPU to address bus 202 is comprised of the time slot number, which designates a memory address for the connection memory. Data is stored in the connection memory, to be noted later, at addresses designating the time slot. Therefore for particular STUs, which are to be accessed at particular time slots, such time slots are designated by the connection memory address which holds data to be output in the designated time slot.

Accordingly the CPU receives data on data bus 107 designating the STU number, and in response accesses signals stored in PROM204 which designates the corresponding address in memory for the data. It should be noted that the STU can be accessed during more than one time slot. In the present system we have defined 24 times slots which are sequentially accessed, shared among 12 STUs. An STU can therefore be accessed on more than one time slot.

With the provision of the connection memory address on the address bus 202, it is applied via switching circuit 207 to the address input of connection memory 208. Data to be stored therein is applied from bus 107 via switch 209 and bus 210 to the data input terminals of connection memory 208. This connection memory can be a 128 by 8 bits random access memory RAM.

Switching circuit 207 contains two positions, a write and a read position. In the write position, the address inputs of RAM208 are connected to address bus 202, whereby data from data bus 207 can be written. The switching circuit is placed in the write switch position under control of a chip select output 211 of chip select decoder 205, via buffer 212. This output also provides chip select and R/W inputs for RAM208 via OR gates 213 and 213a. RAM 208 is also operated via OR gate 213 under control of a timing signal on lead T20 from timing bus 130. The R/W lead connected to OR gate 213a is an output of CPU 200.

Under normal conditions, however, RAM208 will be continuously read. A counter address bus 214 which is derived from the counter 119 continuously increments under control of the bit clock, providing a continuously incrementing read address for RAM208. For reading, the chip select 205a decodes a signal from the CPU which switches switching circuit 208 to the read R position, whereby the counter address bus is connected to the address inputs of RAM208.

RAM208 reads the memory location contents to bus 210, which data is latched in latch 215. This data, which is 8 bits wide, utilizes four bits which designate the type of information, such as telephone, high speed data, VRAM, etc., and the other four bits designate the STU number. Data on the aforenoted first four bits, the type of information, is applied to bus 144, which controls switching circuits 139 and 140, and designates what type of information is applied to the outgoing data streams. The latter four bits designating the STU number is decoded and used to enable the transceivers to individual STUs.

Multiplexers 206a and 206b are used to apply data to address bus 202. Connected to the input of multiplexer 206a is a DIP switch array 216, also connected to ground. Closure of various switches designates the particular RVDM address. Multiplexer 206a has its enable lead connected to an output of decoder 205b.

Multiplexer 206b has its inputs connected to various other leads mentioned earlier with respect to the RVDM, for instance the QCC1, QCC2, sync, B193, etc., leads, which provide polled hardware input flags to the microprocessor. The enable lead of multiplexer 206b is connected to another output of decoder 205b.

Also connected to data bus 107 and address bus 202 is a peripheral input device, which has an address bus 217 and a data bus 218 connected to a VRAM, shared amongst all STUs, and video converters, each of which is individual to an STU.

Operation of the CPU, memories, chip select decoders and multiplexers are well known to persons skilled in the art and will not be described further. A description of the operation of central processing units with their associated memories, etc., may be obtained from Motorola, Inc., Intel Corp., both of the United States, or from the book Microcomputer Primer, by Mitchell Waite and Michael Pardee published by Howard W. Sams & Co. Inc. Similarly, it is assumed that a person skilled in the art would be able to derive various alternative software for operation of the central processing unit and associated memories, to provide the functions described in this specification, and will not be given herein since the software does not constitute the invention.

FIG. 10 shows a block diagram of the preferred form of the converter used in the RVDM. The VHF bus 165 is connected via broadband amplifier 166 to the input of a low pass filter 167, which passes through all signals below 300 megahertz. The output signal is applied via hybrid 168 to a transformer 69. If desired, one of the teminations on hybrid 168 can be connectaed to a second rank of 12 subscribers, otherwise it is terminated with, for example, 50 ohms.

Transformer 69 is connected to the emitter input of grounded base transistor 70 via resistor 71. The collector output applies the video signals to a mixer 72. A local oscillator 73 has its output also connected to mixer 72. Preferably local oscillator 73 is a digitally controlled phase locked loop, which has its digital selection input connected via a data bus 74 to a microprocessor. The microprocess referred to is element 23 of FIG. 2, and the data bus 74 is control bus 34 of FIG. 2.

Accordingly upon receiving a channel selection request by means of a data word applied to digitally controlled phase lock loop forming local oscillator 73, a local oscillator signal is mixed with the incoming video signals, producing an intermediate frequency signal.

The intermediate frequency signal is applied through filter 75, which can be a two-poll L-C filter, through amplifier 76, to a very sharp bandpass filter 77 centered on the IF signal frequency. Preferably the bandpass filter 77 is a SAW filter.

In one prototype, the local oscillator provide a digitally synthesized local oscillator signal frequency of between 430 and 680 megahertz, providing an intermediate frequency of 380 megahertz when mixed with the incoming signal.

The output signal of filter 77 is applied to one input of mixer 78.

A further local oscillator (not shown) generates a signal which is applied to all of the converters used in a particular distribution terminal. This signal is applied to the emitter input of a grounded base transistor 79 through resistor 80. This signal is applied to a tank circuit 81, to peak up its amplitude, and a portion thereof is tapped off and applied to an input of hybrid 82. This signal which is at the output of hybrid 82 is connected to the second input of mixer 78, and as a result, the down-converted intermediate frequency is applied to a band stop filter 83. The down-converted signal from mixer 78 passes through the low pass portion of filter 83 to its output.

An f.m. signal is applied to the emitter of grounded base transistor 84 via resistor 85. Build out resistors from resistor 85 can carry the f.m. signal to the next converter if desired.

The collector output of transistor 84 is connected to the high pass portion of band stop filter 83, and is carried to the output of the filter.

Where the local oscillator signal applied to transistor 79 is, for example, 436 megahertz, mixed with the 380 megahertz intermediate frequency signal, the resultant output signal from mixer 78 is at television channel 2. This signal, with the f.m. 88–108 megahertz is applied to band split filter 86 to the subscriber drop 87. A data line 88 which carries the DS-1 data signal from, and to modems 21 and 22 (FIG. 2) is also connected to band split filter 86. Accordingly filter 86 forms diplexer 19 shown in FIG. 2.

If a second channel is required, a second converter is utilized, and outputs on a different channel than the first.

The transmission line or subscriber drop to the STU carries both video, in either channel 2 or channel 3, and data, in designated time slots modulated on a 12 megahertz carrier signal. The video signal carries either signals from a VRAM at the RVDM, or from a selected television channel, reduced to channel 2 or channel 3, typically. The transmission line carrying this signal to the subscriber drop is not shown. However the description below, with FIG. 6, relates to the data signal.

It will be recalled that transmission to and from an STU is carried out within a designated time slot, therebeing 24 times slots available for 12 STUs (or whatever other number is desired depending on traffic limitation). The first frame is used for control messages, providing 23 frames for transmission of data. Each of the frames is scanned sequentially by the RVDM under control of its CPU. It is therefore required to enable transmission to individual STUs within the designated time slots, whereby data transmitted from the RVDM within that time slot is transmitted to a particular subscriber drop.

As described earlier, the output of latch 215 is 8 bits, 4 of which designate the STU. These bits are carried via bus 400 to the input terminals of 1/16 decoder 401 (only 12 decode outputs of which are used where 12 STUs are to be connected).

The output of decoder 401 which designates STU #1 is applied through inverter 402 to one input of AND gate 403. This is the enable lead, and is on, high, or active for the entire time slot period required to transmit to STU #1.

At the same time data to be transmitted to that STU is present on lead 116, which is output from latch 102 described earlier as carrying data for the STU. This data is passed through inverter 404, and is applied to the second input of AND gate 403. The output of AND gate 403 is connected to the control input of bit modulator 405.

The 12 megahertz carrier which is output from fast limiter 319 is applied via lead 406, buffer 407 and isolation resistor 408 through 15 megahertz low pass filter 409 to isolation resistor 410 which is connected through resistor 411 to ground. Bit modulator 405 is connected from ground through resistor 412 to the junction of resistors 410 and 411. Accordingly the junction of resistors 410 and 411 alternately carry 12 megahertz carrier, modulated at the bit rate output from AND gate 403, during the time slot designated by the output of decoder 401. When there is no output of decoder 401, AND gate 403 is inhibited and there is no modulation of the 12 megahertz carrier at the junction of resistors 410 and 411.

The modulated carrier at the junction of resistors 410 and 411 is applied to the transmit input of directional coupler 413, which applies the signal to a stripline 414. The output of stripline 414 is combined with the channel 2 or 3 video signal and connected to a subscriber drop specifically leading to STU #1.

The bidirectional signal received from stripline 414 is applied via directional coupler 413 through buffer 415 and switch 416 to the input of buffer 417. The output of inverter 402 enables switch 416 closed during the entire period that STU #1 is being transmitted-to, i.e. during the bidirectional time slot designated for STU #1.

The above-described circuit including inverter 402, AND gate 403, switch 405, resistors 410, 411, and 412, directional coupler 413, buffer 415, and switch 416 and their ancillary circuits constitutes a transceiver 418a. Other transceivers 418b, 418c . . . 418m are identical in construction, and have their corresponding resistors 410 connected to the output of low pass 409 for reception of the 12 megahertz carrier. Similarly the outputs of their corresponding switches 416 are connected to the input of buffer 417. The input of their corresponding inverters 402 are connected to individual outputs of decoder 401, whereupon each is enabled within a time slot designated by the input code at the input of decoder 401 on lead 400 from latch 215, which code is obtained from the output of connection memory RAM218. The particular STU enabled is thus controlled by the CPU, under guidance of the signal received on data bus 107, which is received as described earlier with respect to the RVDM from the transmission line, which signals are originated at a central control.

Output signals from the STU received via buffer 417 are applied through 6 megahertz low pass filter 419 and 1 megahertz high pass filter 420 to the input of video amplifier 421 and then to the input of a.m. detector 422. The output is connected to the input of limiter 423. The output of limiter 423 is applied via switch circuit 424 to lead 135, for application to the outgoing or upstream portion of the RVDM, as described earlier.

Switch 424 need only be used where it is described to provide an additional feature of self-checking of signals applied to the STU. In this case a spare output of decoder 401 is used at the enable input of switch circuit 424 to switch lead 135 away from the output of limiter 423, and to the output of an inverting buffer 425 which has its input connected to lead 116 which carries the data which is to be output to the STU. Since this data, during the time slot designated by the spare output of decoder 401 does not go to an STU, it is in this time slot looped back to the RVDM for checking of the circuitry, and of course the data received back should be identical to the data transmitted.

Filters 419 and 420 form an effective 1-6 video bandpass filter for receiving the 6 megahertz signal transmitted by the STU toward the RVDM. The signal is carried through video amplifier 421, is detected in a.m. detector 422, is limited in limiter 423 and is passed back to the RVDM. The output of a.m. video detector 422 is applied through detector and filter 426, integrator 427, to the gain control input of video amplifier 421. The last-noted loop thus forms an AGC control. Video amplifier 421 is similar to amplifier 306, detector 422 is similar to detector 309, and filter and integrators 426 and 427 are similar to filter and integrators 315 and 317. As this circuit is a well known AGC circuit, it need not be described further.

As noted earlier, transmission to STU by the RVDM is by data modulated on a 12 megahertz carrier, while transmission back from the STU to the RVDM is by data modulated on a 6 megahertz carrier. The transmission line also carriers video and f.m. from converters at the RVDM onto control of the subscriber at the STU, and monitored by a central control connected to the main transmission line, if this service is extended. The STU is a microprocessor controlled terminal located at the subscribers home for automatically monitoring and controlling various functions, such as burglar and fire alarms, energy and water meters, for shedding loads off the power line under control of the power company interfacing with the remote central control, for providing digital telephony service, for selecting cable T.V. video channels, for accessing remote data banks, for displaying data on a video screen, for forwarding and receiving data e.g. from a computer, etc. As described earlier, the data signals transmitted between the RVDM and STU occurs in the 6th DS-1 format frame, time slot 1 carrying control messages and the remaining 23 being reserved for data transmissions.

The structure and operation of the STU will be conveniently described with reference to the passage of a signal through it, by which all of the various components are exercised. Please refer to FIGS. 7 and 8.

The signal received from the RVDM along the STU drop 500 referred to in FIG. 6 is applied to modem 501. Here video (typically channel 2 or 3) and f.m. signals are removed by high pass filtering and applied via cable 502 to a television set 503.

In addition, a data output signal is applied via output cable 500 to the STU drop leading to the RVDM.

In a manner analogous to the modem described with reference to FIG. 3, the 12 megahertz carrier is removed as a pilot tone, and appears on lead 505. This signal is also divided by 8 using conventional means, resulting in a bit clock signal at 1.544 megahertz carried by lead 506. rate of 1.544 megahertz, is carried on lead 507. In addition, lead 508 carries the synchronization pulse carry output period. It is assumed that the data rate is in synchronism with the bit clock; if it is found that it is not, the bit clock data carried on lead 506 should be shifted in phase so that both the bit clock and data are in phase.

The data is applied to a center bit sampler with the bit clock signal from lead 506. The center bit sampler is a flip flop, the data being applied to its D input and the bit clock signal being applied to its clock input. The center bit sampler 509 performs the function of bit edge adjustment relative to the bit clock pulses.

The Q output of the center bit sampler flip flop 509 carries the sampled data, and is applied to the input of a shift register 510. This shift register has its output connected to data bus 511, and its enable E input connected to read strobe bus 512. Under control of the local microprocessor, to be described below, shift register 510 is strobed at the time of time slot 1, whereby control information from the RVDM is passed into the shift register, but not data in any of the other time slots. Shift register 510 also is connected to AND gate 513 which has one input connected to the 1.544 megahertz clock source lead 506, and the other to a lead which defines time slot 1, to be described in more detail later. Accordingly under control of the microprocessor, shift register 510 reads the control data into time slot 1, and once 8 bits have been received, are strobed onto the data bus for reception by the microprocessor. In this manner control signals from the RVDM are received by the STU.

Let us assume for this example that the control is connected to data bus 511 and address 523. 4K of ROM524 is similarly connected to the data and address buses, memory select circuits 525 also being connected between address bus 523 and the ROM. The central processing unit is also connected to a control bus 526, which is connected to read strobe decoder 527 and write strobe decoder 528. The read and write strobe decoders have their address inputs connected to address bus 523, and their decoded outputs connected respectively to the read strobe bus 512 and the write strobe bus 514. A watch dog timer 529 is connected from the write strobe output to the central processing unit, in a well known manner.

Data designating that the load has been disconnected is retained by the central processing unit. Another message from the remote central control is received in a similar manner to that described above, requesting that a message should be formulated for transmission back to the central control as to whether the load has been shed. The microprocessor thus applies the data including the number of the load originally addressed and a data signal confirming that the load has been shed, onto the data bus. This data is received in shift register 530, for transmission in time slot 1 back to the RVDM.

It was noted earlier that transmission between the RVDM and STU occurs in the same frame 6, and indeed, in the first time slot which has been designated to carry control data signals. However there is time delay of transmission in both directions, due to transmission path delays, and component operation delays in the STU. It is therefore desired to formulate the data signals being transmitted toward the RVDM in the fifth frame, and then to introduce a delay just prior to transmission which will cause the return signal to arrive at the RVDM in synchronism with time slot 1 of the 6th frame. The generation of the timing will be described below.

The receive bit clock at 1.544 megahertz is applied from lead 506 to a divide-by-193 channel counter 535, which establishes the number of time slots per second (8,000). The output of counter 535 is connected to a divide-by-12 frame counter 536. The outputs of channel counter 535 and frame counter 536 include timing signals designating various time slots, frames, including frame 6.

Initially, it is necessary to synchronize the bits and frames with the receive bits and frame times. Therefore the receive clock signal on lead 506 is applied to channel counter 535. Each 193 bits, of course, is expected that a frame bit will be present, and as noted earlier, the frame bits form a HEX10 pattern. The assumed frame bits are thus applied to counter reset circuit 537, which applied the frame bits to data bus 511. Counter reset circuit 537 of course includes a shift register, strobed by a lead from the strobe bus 514, and applies the assumed correct frame bit pattern to data bus 511. The microprocessor compares this with code pattern with the correct pattern stored in its ROM. If it is not the correct pattern, an additional bit is added to counter 535, causing it in one count to count 194. This effectively shifts the phase of subsequent counts by 1 bit, and the next bit in the frame sequence of each successive frame is monitored for conformity with the correct frame bit sequence. Once the correct frame bit sequence has been found, there is no further insertion of an additional bit for counting by the channel counter, and it continues to sequence with 193 bits.

Once the correct bit phase has been found, counter reset circuit 538 is strobed on the right strobe bus 514, resetting the frame counter 536 following the end of the frame bit sequence. In this manner both the frame and time slot phases are synchronized with the corresponding incoming time slots and frames.

The outputs of channel and frames counters 535 and 536 are various timing signals designating data bit positions, and various frame positions. The timing signals for time slot 1 are applied to the time slot 1 generator 539, which in response applies an output pulse on lead 540 for the duration of time slot 1. Similarly the A channel transmission bit timing signal is applied to timing strobe generator 540, which applies an output pulse on lead 541 for the duration of the A bit.

Additional time slot assignors 542 and 543 are similarly connected for other time slots, which apply output pulses on leads 544 and 545 respectively during the time periods of high speed channels, to be discussed in more detail later.

The timing signals on leads 540, 541, 544 and 545 are applied to a flip flop 546, for resynchronizing with the data bits. Resynchronization is done to the input bit clock, lead 506 being connected to the clock input of flip flop 546.

The four outputs of flip flops 546, which correspond with the outputs from the time slot assignors, time slot 1 generator and timing strobe generator are applied to the control inputs of corresponding switches (such as CMOS switches 547, 548, 549 and 550). Accordingly, for example, when a signal appears on lead 545, it is applied, after synchronization with the receive bit clock, to the control input of switch 547.

The input of switch 547 is connected to the output of shift register 530, which, it will be recalled, carried the data output signal from the STU to the RVDM. This passes, during time slot 1, through switch 547, and on to transmit data bus 551. Similarly the output of each of switches 548, 549, and 550 is connected to transmit data bus 551, one of each of the switches being closed during appropriate time periods designated by the outputs from time slot assignors 542 and 543 and time slot generator 539 and timing strobe generator 540. Only one is of course closed at a time.

As was noted earlier, it is preferred that time slot 1 generator 539 should be enabled during the first time slot of frame 5, rather than frame 6. It is therefore necessary, to have the data pass out toward the RVDM in frame 6, to introduce a delay. It has been found desirable to introduce both a fixed delay and a variable delay, which variable delay is controlled depending on transmission path and component delays. This can of course vary with temperature, aging of components, etc.

Data bus 551 is connected to a shift register 552, which introduces a fixed delay which has usefully found to be adequate with 128 bits delay. The output of shift register 552 is connected to the input of a variable 64 bit delay shift register 553. The combined maximum delay, is of course, one complete frame of 192 bits, discounting the frame bits. The output of shift register 553 is connected via output cable 504 to modem 501, where it is applied to the STU drop 500 for transmission to the RVDM, and further processing as was described earlier. Modem 501 modulates the output data signal from shift register 553 on a 6 megahertz carrier, which is divided by 2 from the 12 megahertz received carrier.

The 12 megahertz received carrier, as was noted earlier, appears from modem 501 on the pilot tone lead 505, and is applied to a divide-by-8 counter 554. The output signal is at the transmit clock frequency of 1.544 megahertz, which signals are applied to the clock C inputs of shift registers 552 and 553.

From time to time, and at initialization, the RVDM checks the synchronization of received and transmitted signals in time slot 1 of channel 6. As was described earlier, it transmits a HEX10 code the STU and determines whether the correct code has been received. The introduction of delay was described earlier with respect to transmission of data from the RVDM up the transmission line to a central control, the delay being introduced as a memory offset address signal in watch 154.

The present circuit operates similarly, the RVDM sending a delay code to the STU microprocessor for application to latch 555. The latched code is applied to shift register 553, for varying the delay from 0 up to 64 bits.

The transmit clock 554 is also adjusted similarly. A two bit code is introduced from the microprocessor which adds 2, 4 or 6 bits to the clock count, thereby advancing shift registers 552 and 553 by ¼ bit intervals.

Latches 555 and 556 are enabled from the right strobe bus 514.

It has thus been seen how a load shedding signal designated for a particular load is received via the RVDM over subscriber drop 500, and how a return signal is generated and is applied in the same time slot back to the RVDM, modulated on a 6 megahertz carrier.

As was noted earlier, meters and alarms can also be read. A meter port, comprising encoder 559, has a plurality of inputs 560 connected to a source of pulses corresponding to meter rotation. Sources of pulses of this type are well known, and may consist, for example, of a magnetically generated pulse each time a rotor, driven by an energy consuming load rotates. Pulse generator 561 has its output connected through buffer 562 to meter input 560 of encoder 559. Encoder 559 is strobed by a lead from read strobe bus 512. The CPU, in routinely enabling encoder 560, allows pulses generated in pulse generators such as 561 connected to its input ports to be applied to various leads of data bus 511. The microprocessor thus counts pulse transitions, thus retaining a reading count for later routine or designated polling from the central control.

Similarly, an alarm port comprising a group of switches 563 interconnects alarm inputs 564 to data bus 511 when strobed from a lead in read strobe 512. Alarm inputs such as 564 are each connected through make or break switches 565 to ground. Upon read strobing from strobe bus 512, each of the switches within alarm port 563 are connected to individual bus leads, and the closure or opening of switches such as 565 provide an alarm input to the microprocessor. Upon this occurring, the microprocessor generates an interrupt and sends an alarm message to the RVDM for transmission to the central control. The alarm switches 565 are for connection as fire or burglar alarm indications.

As noted earlier, the STU can request data to be transmitted to the subscribers television set 503 by the use of a local key pad. A UART 570, with its local crystal, is connected with its parallel data input to data bus 511. The output of UART 570 is an asynchronous serial bus. Preferably the UART is a CMOS type 1854, available from Radio Corporation of America. The UART receives parallel data and formulates it asynchronous format, containing a low level start bit, 8 data bits, an even parity bit, and then one or more high level stop bits. In the present case, the UART is to address one or more addressable UARTs, such as Motorola type MC14469, in a format containing two 11 bit words of the type described above, the first word containing the address and the second containing the command or data word. Addressable UART 572 is connected to asynchronous bus 571. A key pad 573 is connected in a conventional manner to UART 572. Key pad 573 contains light emitting diodes and a plurality of keys, e.g., 20, as well as 2–7 segment displays.

UART 570 is read in a similar manner as the meter and alarm ports described above. The UART 570 addresses UART 572, commanding it to forward any data which is input thereto. Assuming the subscriber depresses a button in key pad 573, UART 572 sends it along asynchronous bus 571 to UART 570, which applies it in parallel form to data bus 511. The microprocessor sends a message back to key pad 573 via UART 570, bus 571 and UART 572 to illuminate a light emitting diode, and indicate the depressed digit in the 7 segment, dual digit display. At the same time it formulates a signal which is transmitted to the RVDM indicating request for a television channel. The signal is dealt with as described with respect to the RVDM, and is forwarded to the main transmission line for transmission to the central control.

Upon reception of a signal from the central control, the RVDM microprocessor applies a channel selection signal to the converter connected to the STU drop related to the present STU which has requested the service. The selected channel is thus received by television set 503. At the same time the RVDM transmits the channel request signal to the local STU via time slot 1 of frame 6 as described earlier, and the microprocessor in response applies a signal via UART 570, bus 571, and URAT 572 to key pad 573, extinguishing the light emitting diode.

In this manner, the key pad may be used to select various television channels, including pay t.v. channels, or other data or video signals from the central control, and display it on the local television set 503. It should be noted that since each command signal from key pad 573 is transmitted towards the central control, the central control can obtain billing information for pay t.v., can amass channel viewing information, etc., for the use of advertisers or the like. Further key pad 573 can be used for interactive video by which audience response can be offerred to a broadcaster.

The present invention also provides means for accessing and displaying high data rate signals, such as computer signals, high resolution teletext such as TELEDON TM signals, telephony voice signals, etc.

For high speed data, a latch 575 is connected to data bus 511, and is enabled by write strobe 514. The output of latch 575 is comprised of control bits for controlling alpha-numerics and colour on a video screen 576. The video screen may be a t.v. monitor, television set, or television set modified to display high resolution alpha-numerics and graphics. The control signals from latch 575 are applied via bus 577 to a high speed data module 578 such as a TELEDON terminal, for controlling the application of signals to video monitor 576.

Also connected to high speed module 578 is the output of addressable UART 579, which is addressed from asynchronous bus 571 in a similar manner as addressable URAT 572. A further addressable UART 580 is connected to synchronous bus 571, and is further connected to a key board 581.

Keyboard 581 operates in a similar manner as key pad 573, by which services is requested and keys are depressed. A VRAM in the RVDM receives the signals and causes display of the key indication alpha-numerics, preferably on a line at the bottom of the display in video monitor 576. The video signals themselves are received from the output of the centre bit sampler 509 as high speed data (up to 56 kilobits) and are applied by the high speed data module 578 directly to video monitor 576.

Upon the line of alpha-numerics in the video display being correct for the user, a control key is depressed on keyboard 581, which causes the microprocessor to forward that entire line to the central control. The central control accesses the data requested from a file and forwards it in a high speed data channel to the STU. The data at the output of centre bit sampler 509 is then applied via high module 578 to the video monitor 576.

In the alternative the data can be sent in video format from central control on a spare television channel, which is selected by the converter associated with the present STU, converted to channel 2 or 3, and viewed on television set 503, rather than television set 576.

It should be noted that if a local data terminal is to be used, it can be connected between latch 575 and a high speed data port 582, which is similar to ports 519, 559 and 563. Port 582 operates similarly as the others, and reads the control bits associated with high speed module 578, which, it will be noted, can be either a data terminal or means for controlling video monitor 576.

It may be seen that keyboard 581 can be used to select data for display either on a standard television set 503, by receiving information in video format, or can control the application of signals on a video monitor or television set 576 by accessing a high speed data signal. Further, a high speed data terminal can be used in association with the STU to interface with the remainder of the system, and transmit data or other control signals to a central control, or via the central control to another subscriber. Accordingly a number of different ways of providing user-system and/or user-user interactive low or high speed terminals is obtained, and the type of service offerred depends on the economics of the application.

The present system can also be used to provide digital telephone service. Upon reception of a request for service from a local telephone set 585, an off-hook detector 586 provides a signal to a telephone read port 587, which is similar to the above-identified ports 519, 559, etc. Upon strobing by a read strobe on read strobe bus 512, the microprocessor determines that there is an off-hook condition, and sends a message to the central control of a request for service, and that a high speed telephony digital channel should be opened. The analog signal from telephone read port 587 is applied to 2/4 wire network 588, which is connected via filters 589 in a conventional manner to codec 590. The output signal is applied from codec 590 to the input of switching circuit 550, for application to data bus 551 within the frame or frames assigned under control of the CPU by time slot assignor 542. The time slot assignation from the microprocessor is applied to assignor 542 by latch 591, which has its input connected to data bus 511 and which is strobed from right strobe bus 514.

Similarly, the high speed unit output is connected to switch 549 for outward transmission of high speed data under control of the microprocessor having assigned time slots for transmission of the high speed data. As noted earlier, this can be at a 56 kilobit per second rate. The time slot is assigned by the microprocessor, the time slot data being latched in latch 592, and is applied to time slot assignor 543 for controlling the timing of the closure of switch 549, as described earlier.

In a similar manner, switch 548 is controlled, latch 593 controlling its closure during the application of a bit control signal.

A person skilled in the art understanding this description may now conceive of other embodiments or variations. All are considered to be within the sphere and scope of this invention as defined in claims appended hereto.

The embodiments of the invention in which an exclusive property or privilege is claimed are defined as follows:

1. A subscriber communication terminal comprising:
   (a) a modem for receiving incoming data signals from an incoming carrier having a first frequency, for deriving a bit clock signal from the incoming carrier, for generating an outgoing carrier from the incoming carrier and for transmitting outgoing data signals on the outgoing carrier,
   (b) the incoming data signals being in the form of frames of data bits, each frame being divided into channels of a predetermined number of bits and ending with an extra frame bit, the frame bits form a predetermined pattern, control signals being contained in a predetermined channel,
   (c) a first shift register connected in a circuit with the modem for receiving the data signals,
   (d) means for enabling the shift register during the time of the predetermined channel whereby the control signals are read into and stored in the shift register during the time of the predetermined channel,
   (e) a bus system for receiving the control signals from the shift register,
   (f) means for receiving the bit clock signal and for generating frame and channel count timing signals therefrom,
   (g) a second shift register connected to the bus system for receiving outgoing data signals,
   (h) a circuit including a switch for carrying the outgoing data signals to the modem for modulation on the outgoing carrier,
   (i) a time slot generator adapted to receive the timing signals for generating control signals for said switch and for the second shift register, for controlling the time of application of said outgoing data signals in a predetermined outgoing channel,
   (j) port means connected to the bus system for connecting to at least one of data generating and receiving apparatus, and
   (k) a microprocessor connected to the bus system for receiving the incoming data signals, generating control signals, reading signals from the port means and writing signals to the port means, and generating said outgoing data signals.

2. A communications terminal as defined in claim 1, in which said circuit including said switch includes a controllable delay means adapted under control of the microprocessor to delay outgoing data signals a time sufficient to synchronize said incoming and outgoing data signals at a remote location.

3. A communications terminal as defined in claim 1 or 2 in which the incoming and outgoing carrier signals are at different frequencies carried by a subscriber drop.

4. A communications terminal as defined in claim 1 or 2 in which the incoming and outgoing carrier signals are at different frequencies carried by a coaxial cable subscriber drop.

5. A communications terminal as defined in claim 2 in which the incoming and outgoing carrier signals are at different frequencies carried by a coaxial cable subscriber drop the subscriber drop also carrying CATV television signals, and further including means for connecting a television set to the subscriber drop with the modem.

6. A communications terminal as defined in claim 5, further including means for connection to one of said ports for generating television channel selection control signals, for transmission via the outgoing carrier to a remote television channel converter, for control of a CATV channel transmitted along the subscriber drop for reception by the television set.

7. A communications terminal as defined in claim 6, in which at least one of said ports is a master UART, having an asynchronous bus output for connection to a remote UART, said remote UART comprising means for connection to said television channel selection control signal generator.

8. A digital data transmission system comprising a central station including means for transmitting and receiving digital data signals in a format having a series of frames each having a plurality of time slots and each time slot having a plurality of bits, a plurality of remote subscriber terminal units each including means for transmitting and receiving digital data signals in said format, a plurality of remote receiving stations, each receiving station having connected thereto a plurality of said subscriber terminal units, and tree-type transmission means interconnecting said central station with each of said receiving stations, each receiving station including means for receiving digital data signals in said format from said central station and from said subscriber terminal units connected thereto and for regenerating from said received data signals new data signals in said format and means for transmitting said new data signals to said subscriber terminal units and to said central station respectively.

9. A system as defined in claim 8 wherein said transmitting means includes means for scanning each of the subscriber terminal units in sequential time slots and means for transmitting said data signals to respective subscriber terminal units in time slots allocated thereto.

10. A system as defined in claim 8 wherein the format includes data signals designated as address, data and control signals, wherein the transmission means of each receiving station includes means for stripping of the control signals and integrating new control signals with regenerated data signals, and means for transmitting the new control signals and regenerating data signals to designated ones of said subscriber terminal units.

11. A system as defined in claim 10, including means for modulating the regenerated data signals and new control signal, on an outgoing carrier for transmission to the subscriber terminal units, the outgoing carrier being derived from the incoming carrier.

12. A system as defined in claim 8, wherein each said receiving station includes means for receiving data signals from the individual subscriber terminal units modulated on a second carrier each during the predetermined time slots, means for demodulating the second carrier to derive demodulated data bits, means for applying the demodulated data bits to a controller, the controller being adapted to reformat the demodulated data bits and to write them at first predetermined times designated by the controller into a memory, means for reading the memory at times delayed from the first predetermined times, and means for applying the data from the memory to a modem for modulation on an outgoing carrier and application to the transmission means, the delay being predetermined to place the outgoing data in bit synchronization and in a predetermined frame with the incoming data at a remote location connected to the transmission line.

13. A system as defined in claim 12 further including a plurality of television channel converters having inputs connected to the transmission means for reception of CATV signals, individual outputs thereof connected to corresponding subscriber terminal units, control inputs of the converter being connected to the receiving stations for controlling individual channels applied to the subscriber terminal units upon reception of a converter selection control signal from a corresponding subscriber terminal unit.

14. A system as defined in claim 8 in which each subscriber terminal unit is comprised of:
(a) a modem for receiving data signals modulated on an incoming carrier having a first frequency, for deriving a bit clock signal from the incoming carrier and for transmitting data signals on an outgoing carrier having a second frequency,
(b) means for applying the received data signals to a bus system.
(c) means for connecting a plurality of ports to the bus system, the ports being adapted to connect data generating apparatus to the bus system, when enabled,
(d) control means connected to the bus system and to the means for connecting a plurality of ports for controlling the operation of the ports, and for generating said outgoing data signals in response to the application of control signals from the ports generating by said data generating apparatus to the bus system, in synchronization with said bit clock, and
(e) means for applying outgoing data signals to the modem for modulation on the outgoing carrier.

15. A system as defined in claim 14, in which the means for connecting a plurality of ports to the bus system is comprised of a plurality of switches enabled from the bus system under control of the control means.

16. A system as defined in claim 15, further including a codec connected in a circuit to the modem for received data signals therefrom, a subscriber line interface circuit connected to the codec and having a tip and ring lead for connection to a telephone set, means for detecting supervisory signals generated by a telephone set connected between the tip and ring lead and a read port connected to the bus system, and a write port connected between the bus system and the subscriber line interface system for generating ringing signals for application to the tip and ring lead.

17. A system as defined in claim 15, in which said ports are adapted to receive data from at least one of a load activity indicator, an energy meter, a keypad, a keyboard, a telephone supervisory state sensor, a fire alarm, a smoke alarm, and a plurality of burglar alarm switches, and to apply control signals to at least one of a load controller, an alphanumeric and/or illuminated display, telephone control apparatus, and a data terminal.

18. A system as defined in claim 14, in which the means for connecting a plurality of ports to the bus system is comprised of a master UART, having an asynchronous bus connected to a plurality of remote addressable UARTs, further including means for connecting data data generating apparatus to the addressable UARTs.

19. A system as defined in claim 18, in which the means for connecting a plurality of ports further includes at least one write port and at least one read port, the read port being comprised of a plurality of switches enabled from the bus system under control of the control means, the write port being under control of the control means for receiving data addressed to the write port and applying said data to a terminal including are of means for display of and control by said data addressed to the write port.

20. A system as defined in claim 14, in which the transmitting means of each receiving station is arranged to transmit data in a predetermined time slot unique to the respective terminal in one frame of said format, and in which the transmitting means of said respective terminal unit is arranged to transmit data in the same time slot and the same frame number of a later following sequence of frames.

21. A system as defined in claim 20, wherein each terminal unit includes means for storing the data for transmission for a controllable period of time, means for applying said data to the storing means via a switch, means under control of the controlling means for generating time slot controlling signals, and for applying the time slot controlling signals to the switch for controlling the application of the data to the storing means within predetermined time slot periods, and means for setting the storage time sufficient to delay the data to a period whereby it arrives at the receiving station in the same time slot and frame number.

22. A system as defined in claim 21, in which the data signals are divided into frames of data words, and including a sequence of fame bits, the frame bits having a predetermined bit pattern, the data signals including control signals in a predetermined frame, means for applying the control signals to the bus system when strobed by the bit clock and by signals designating the predetermined frame, means for deriving bits from the bit clock at a frame bit rate, means for comparing the derived bit pattern with a predetermined pattern stored in the control means, means for shifting the derived frame bit rate by one bit in the event the derived bit pattern does not match the predetermined pattern, means for counting frame bits to derive a frame count, and means for generating said time slot controlling signals from the means for deriving bits from the bit clock and the means for counting frame bits.

23. A system as defined in claim 14, in which each subscriber terminal is comprised of:
   (a) a modem for receiving data signals from an incoming carrier having a first frequency, for deriving a bit clock signal from the incoming carrier, for generating an outgoing carrier from the incoming carrier and for transmitting outgoing data signals on the outgoing carrier,
   (b) the incoming data signals being in the form of frames of data bits, each frame being divided into channels of a predetermined number of bits and ending with an extra frame bit, the frame bits form a predetermined pattern, control signals being contained in a predetermined channel,
   (c) a first shift register connected in a circuit with the modem for receiving the data signals,
   (d) means for enabling the shift register during the time of the predetermined channel whereby the control signals are read into and stored in the shift register during the time of the predetermined channel,
   (e) a bus system for receiving the control signals from the shift register,
   (f) means for receiving the bit clock signal and for generating frame and channel count timing signals therefrom,
   (g) a second shift register connected to the bus system for receiving outgoing data signals,
   (h) a circuit including a switch for carrying the outgoing data signals to the modem for modulation on the outgoing carrier,
   (i) a time slot generator adapted to receive the timing signals for generating control signals for said switch and for the second shift register, for controlling the time of application of said outgoing data signals in a predetermined outgoing channel,
   (j) port means connected to the bus system for connection to at least one of data generating and receiving apparatus, and
   (k) a microprocessor connected to the bus system for receiving the incoming data signals, generating control signals, reading signals from the port means and writing signals to the port means, and generating said outgoing data signals.

24. A system as defined in claim 23 in which said circuit including said switch includes a controllable delay means adapted under control of the microprocessor to delay outgoing data signals a time sufficient to synchronize data signals transmitted and received by said receiving station.

25. A system as defined in claim 24 in which the incoming and outgoing carrier signals are at different frequencies carried by a coaxial cable subscriber drop, the subscriber drop also carrying CATV television signals, and further including means for connecting a television set to the subscriber drop with the modem.

26. A system as defined in claim 25 further including means for connection to one of said ports for generating television channel selection control signals, for transmission via the outgoing carrier to a remote television channel converter, for control of a CATV channel transmitted along the subscriber drop for reception by the television set.

27. A system as defined in claim 26 in which at least one of said ports is a master UART, having an asynchronous bus output for connection to a remote UART, said remote UART comprising means for connection to said television channel selection control signal generator.

* * * * *